US012625308B2

(12) United States Patent
Jung et al.

(10) Patent No.: US 12,625,308 B2
(45) Date of Patent: **\*May 12, 2026**

(54) OPTICAL FILTER

(71) Applicant: LMS CO., LTD., Pyeongtaek-si (KR)

(72) Inventors: Joon Ho Jung, Pyeongtaek-si (KR);
Seon Ho Yang, Pyeongtaek-si (KR);
Sung Min Hwang, Pyeongtaek-si (KR);
Choon Woo Ji, Pyeongtaek-si (KR);
Sung Yong Moon, Pyeongtaek-si (KR)

(73) Assignee: LMS CO., LTD., Pyeongtaek-si (KR)

( \* ) Notice: Subject to any disclaimer, the term of this
patent is extended or adjusted under 35
U.S.C. 154(b) by 303 days.

This patent is subject to a terminal dis-
claimer.

(21) Appl. No.: 18/479,153

(22) Filed: Oct. 2, 2023

(65) Prior Publication Data

US 2024/0125990 A1      Apr. 18, 2024

(30) Foreign Application Priority Data

Oct. 6, 2022    (KR) ........................ 10-2022-0127961

(51) Int. Cl.
*G02B 5/20*            (2006.01)
(52) U.S. Cl.
CPC .................................. *G02B 5/208* (2013.01)
(58) Field of Classification Search
CPC ............ G02B 5/20; G02B 5/208; G02B 5/22;
G02B 5/226; G02B 5/28; G02B 5/281;
G02B 5/282; G02B 5/283; G02B 5/285;
G02B 5/003; G02B 5/08; G02B 5/26;
G03B 11/00; H04N 23/55
See application file for complete search history.

(56) References Cited

U.S. PATENT DOCUMENTS

| | | | |
|---|---|---|---|
| 2015/0146057 A1 | 5/2015 | Konishi et al. | |
| 2017/0017023 A1 | 1/2017 | Sugiyama et al. | |
| 2018/0095203 A1 | 4/2018 | Ooi et al. | |
| 2020/0040161 A1 | 2/2020 | Kubo et al. | |
| 2022/0299687 A1 | 9/2022 | Sakagami | |
| 2024/0125988 A1* | 4/2024 | Jung ...................... | G02B 5/285 |
| 2024/0125989 A1* | 4/2024 | Jung ........................ | G02B 5/28 |

FOREIGN PATENT DOCUMENTS

| | | |
|---|---|---|
| JP | 2016070965 A | 5/2016 |
| JP | 2017090687 A | 5/2017 |
| KR | 20150100618 A | 9/2015 |
| KR | 101887846 B1 | 8/2018 |
| KR | 20190124796 A | 11/2019 |
| KR | 102056613 B1 | 12/2019 |

(Continued)

*Primary Examiner* — Stephone B Allen
*Assistant Examiner* — Adam W Booher
(74) *Attorney, Agent, or Firm* — NKL LAW; Jae Youn
Kim

(57)            ABSTRACT

The provided is an optical filter for its use. In the present
invention, it is possible to provide an optical filter that
effectively blocks ultraviolet ray and infrared ray and exhib-
its high transmittance in visible light. Furthermore, it is
possible to provide an optical filter where the transmission
characteristics are stably maintained even when an incident
angle is changed. Moreover, it is possible to provide an
optical filter that does not exhibit problems such as ripple
and petal flare, and thus to provide the optical filter with
excellent durability.

20 Claims, 21 Drawing Sheets

(56) References Cited

FOREIGN PATENT DOCUMENTS

| | | | | |
|----|----|----|----|----|
| TW | 202212867 | A | 4/2022 | |
| TW | 202234096 | A | 9/2022 | |
| WO | 2014/030628 | A1 | 2/2014 | |
| WO | 2014104370 | A1 | 7/2014 | |
| WO | 2016/114362 | A1 | 7/2016 | |
| WO | 2016181987 | A1 | 11/2016 | |
| WO | 2018123705 | A1 | 7/2018 | |
| WO | WO-2022065678 | A1 * | 3/2022 | ............. G02B 5/281 |
| WO | 2023282186 | A1 | 1/2023 | |

* cited by examiner

| 201 |
| --- |
| 100 |
| 202 |

FIG. 1

| 201 |
| --- |
| 300 |
| 100 |
| 202 |

FIG. 2

| 201 |
| 100 |
| 300 |
| 202 |

FIG. 3

| 201 |
|:---:|
| 301 |
| 100 |
| 302 |
| 202 |

FIG. 4

OPTICAL FILTER

FIELD

This invention relates to an optical filter and an image capturing device.

BACKGROUND

An optical filter is used in an imaging capturing device using a charge-coupled device (CCD) or a complementary metal-oxide-semiconductor (CMOS) image sensor. Such optical filters are used to obtain good color reproducibility and sharp images and are also called as near-infrared cut filters. Thus, various characteristics are required for such an optical filter.

The optical filter must transmit visible light with high transmittance while effectively blocking light in the ultra-violet and infrared regions. To achieve such characteristics, rapid and sharp change in transmittance is required at the boundary between ultraviolet light and visible light to be blocked and at the boundary between infrared and visible light.

The optical filter needs to maintain the transmission and blocking characteristics as described above even when the incident angle changes. As such wide-angle cameras are developed, these characteristics become more important, and the need for an optical filter maintaining transmission and blocking characteristics even at a wider angle of incidence is bigger.

For the optical filter, it is also necessary that a phenomenon called ripple shall be suppressed. The ripple is a phenomenon where a periodic change in transmittance occurs in the visible light region, and a phenomenon where actual transmittance in a predetermined region increases and decreases compared to the average transmittance of the corresponding region is periodically observed. The imaging capturing device senses visible light transmitted through the optical filter by a sensor for each respective RGB (Red, Green, Blue) color. The sensitivity of each sensor of RGB is adjusted in consideration of the average transmittance for each wavelength. When the ripple occurs, fluctuation occurs in the light recognized by the sensor, and thus, color reproducibility is lowered. Such a ripple phenomenon may generate a region (called as a bunk region) where transmittance is momentarily dropped in the visible light region thereby causing a ghost phenomenon. This ghost phenomenon also deteriorates color reproducibility.

Recently, a phenomenon—called as a petal flare—has also become a problem. The petal flare phenomenon refers to a phenomenon where a red line is shown in a photograph although it was not observed by naked eyes when the photograph is taken. It is also called as the petal flare because there are many cases where the red line from a light emitting body is shown as a shape of a floral leaf. Because the sensitivity of the sensor included in the imaging capturing device increases and the transmittance of an optical filter is increased to obtain a clearer picture, the occurrence of the petal flare is increasing.

Because an image capturing device is used in various environments and frequently used under harsh conditions, the optical filter is required to have excellent durability to maintain its optical characteristics even under the harsh conditions. As a publicly known optical filter, an optical filter comprising an absorption layer containing an absorbent and/or a reflection layer adapting a dielectric film is known. When a dielectric film is used, light in the ultraviolet and/or infrared region can be blocked. However, the dielectric film has a characteristic that the transmittance curve changes (shifts) depending on the incident angle. Therefore, to compensate for the disadvantages of the dielectric film, an optical filter using an absorption layer containing a near-infrared absorbing dye having a small incident angle dependence of transmittance is also known.

An optical filter adapting a so-called infrared absorbing glass (also called as a blue glass) having a near-infrared absorption property as a substrate is also known. An infrared absorbing glass is a glass filter where material such as CuO is added to the glass to selectively absorb light in the near infrared wavelength region.

However, since the infrared absorbing glass exhibits absorption characteristics to some extent even in the visible light region, there is a problem where the transmittance of visible light is also reduced. Furthermore, the infrared absorbing glass usually has poor durability under high temperature or high humidity conditions. Therefore, it is a difficult problem to obtain an optical filter that exhibits desired blocking and transmission characteristics, does not shift transmission characteristics according to an incident angle, and does not generate ripples and petal flares, etc.

SUMMARY

An object of the present invention is to provide an optical filter that effectively blocks ultraviolet and infrared rays and exhibits high transmittance in visible light for its use.

Another object of the present invention is to provide an optical filter where the transmission characteristics are stably maintained even when an incident angle is changed thereby preventing of showing problems such as ripple or petal flare for its use.

According to an embodiment of the invention, there is provided that an optical filter comprising an infrared absorbing substrate containing copper; a first dielectric film formed on a first surface of the infrared absorbing substrate and including a structure where a first sub-layer and a second sub-layer, respectively, having a different refractive index are repeatedly stacked; a second dielectric film formed on a second surface of the infrared absorbing substrate and including a structure where a third sub-layer and a fourth sub-layer, respectively, having a different refractive index are repeatedly stacked; V value for the first dielectric film in the following Equation 1 is defined as $V_1$, a V value for the second dielectric film in the Equation 1 is defined as $V_2$ where the Equation 1:

$$V = \log\left[\left\{\left(\frac{(R \times \mathrm{Cu})^{2p}}{n_2} + K\right)^2\right\} + \left\{\frac{(R \times \mathrm{Cu})^{2p}}{n_2} - K\right\}\right],$$

where $n_1$ is a refractive index for a sub-layer having a larger refractive index between the first sub-layer and the second sub-layer or between the third sub-layer and the fourth sub-layer; $n_2$ is a refractive index for a sub-layer having a smaller refractive index between the first sub-layer and the second sub-layer or between the third sub-layer and the fourth sub-layer; R is a ratio $(n_1/n_2)$ of $n_1$ to $n_2$; Cu is an amount of the copper contained in the infrared absorbing substrate; K is a total number of the first sub-layer and the second sub-layer in the first dielectric film or a total number of the third sub-layer and the fourth sub-layer in the second dielectric film; and 2p is K−1 where a sum of $V_1$ and $V_2$ is in a range of 15 to 50 and a ratio of $V_2$ to $V_1$ ($V_2/V_1$) is in a range of 4 to 12.

In an embodiment, the amount of the copper in the infrared absorbing substrate is in a range of 1 weight % to 7 weight % for the optical filter in the present invention.

In an embodiment, the infrared absorbing substrate is a CuO-containing fluorophosphate glass substrate or a CuO-containing phosphate glass substrate for the optical filter in the present invention.

In an embodiment, the infrared absorbing substrate has a maximum transmittance within a range of 10% to 45% in a wavelength range of 700 nm to 800 nm and an average transmittance within a range of 5% to 30% in the wavelength range of 700 nm to 800 nm for the optical filter in the present invention.

In an embodiment, the infrared absorbing substrate has a maximum transmittance within a range of 5% to 30% in a wavelength range of 800 nm to 1,000 nm, and an average transmittance within a range of 3% to 20% in the wavelength range of 800 nm to 1,000 nm for the optical filter in the present invention.

In an embodiment, the infrared absorbing substrate has a maximum transmittance within a range of 10% to 70% in a wavelength range of 1,000 nm to 1,200 nm and an average transmittance within a range of 10% to 50% in the wavelength range of 1,000 nm to 1,200 nm for the optical filter in the present invention.

In an embodiment, the V value for the first dielectric film ($V_1$) according to the Equation 1 is in a range of 1 to 10 for the optical filter in the present invention.

In an embodiment, a maximum reflectance for the first dielectric film in a wavelength range of 700 nm to 800 nm is 15% or less and an average reflectance for the first dielectric film in the wavelength range of 700 nm to 800 nm is 10% or less for the optical filter in the present invention.

In an embodiment, a maximum reflectance for the first dielectric film in a wavelength range of 800 nm to 1,000 nm is 30% or less and an average reflectance for the first dielectric film in the wavelength range of 800 nm to 1,000 nm is 30% or less for the optical filter in the present invention.

In an embodiment, the V value for the second dielectric film ($V_2$) according to the Equation 1 is in a range of 10 to 60 for the optical filter in the present invention.

In an embodiment, the second dielectric film has a maximum reflectance of 50% or more within a wavelength range of 700 nm to 800 nm and an average reflectance of 50% or more within the wavelength range of 700 nm to 800 nm for the optical filter in the present invention.

In an embodiment, the second dielectric film has a maximum reflectance of 80% or more within a wavelength range of 800 nm to 1,000 nm and an average reflectance of 80% or more within the wavelength range of 800 nm to 1,000 nm for the optical filter in the present invention.

In an embodiment, an average reflectance in a wavelength region of 600 nm to 900 nm is 70% or less for the optical filter in the present invention.

In an embodiment, the shortest wavelength exhibiting a reflectance of 50% in a wavelength region of 600 nm to 900 nm is in a range of 690 nm to 750 nm for the optical filter in the present invention.

In an embodiment, the optical filter in the present invention further comprises a light absorbing layer on one or both surfaces of the infrared absorbing substrate.

In an embodiment, the first dielectric film has a thickness within a range of 100 nm to 500 nm for the optical filter in the present invention.

In an embodiment, each of the first sub-layer and the second sub-layer has a thickness in a range of 5 nm to 200 nm and an average value of the thicknesses of the first sub-layer and the second sub-layer is in a range of 10 nm to 100 nm for the optical filter in the present invention.

In an embodiment, the second dielectric film has a thickness within a range of 3,000 nm to 6,000 nm for the optical filter in the present invention.

In an embodiment, each of the third sub-layer and the fourth sub-layer has a thickness in a range of 1 nm to 300 nm and an average value of the thicknesses of the third sub-layer and the fourth sub-layer is in a range of 80 nm to 200 nm for the optical filter in the present invention.

In an embodiment, the shortest wavelength exhibiting a transmittance of 50% in a wavelength region of 350 nm to 425 nm is in a range of 400 nm to 425 nm for the optical filter in the present invention.

In an embodiment, the longest wavelength exhibiting a transmittance of 50% in a wavelength region of 560 nm to 700 nm is in a range of 590 nm to 660 nm for the optical filter in the present invention.

In an embodiment, an absolute value of $\Delta T_V$ for the following Equation 2 is 20% or less:

$$\Delta T_V = 100 \times (T_{Vf} - T_{Vi})/T_{Vi}, \qquad \text{[Equation 2]}$$

where in Equation 2, $T_{Vf}$ is an average transmittance in a wavelength range of 425 nm to 560 nm after maintaining the optical filter at a temperature of 85° C. and a relative humidity of 85% for 120 hours and $T_{Vi}$ is an average transmittance in the wavelength range of 425 nm to 560 nm before maintaining the optical filter at a temperature of 85° C. and a relative humidity of 85% for 120 hours for the optical filter in the present invention.

In an embodiment, an image capturing device comprises the optical filter in the present invention.

BRIEF DESCRIPTION OF DRAWINGS

FIGS. 1 to 4 are drawings showing an exemplary structure of an optical filter of the present invention.

DETAILED DESCRIPTION

Figure 5:
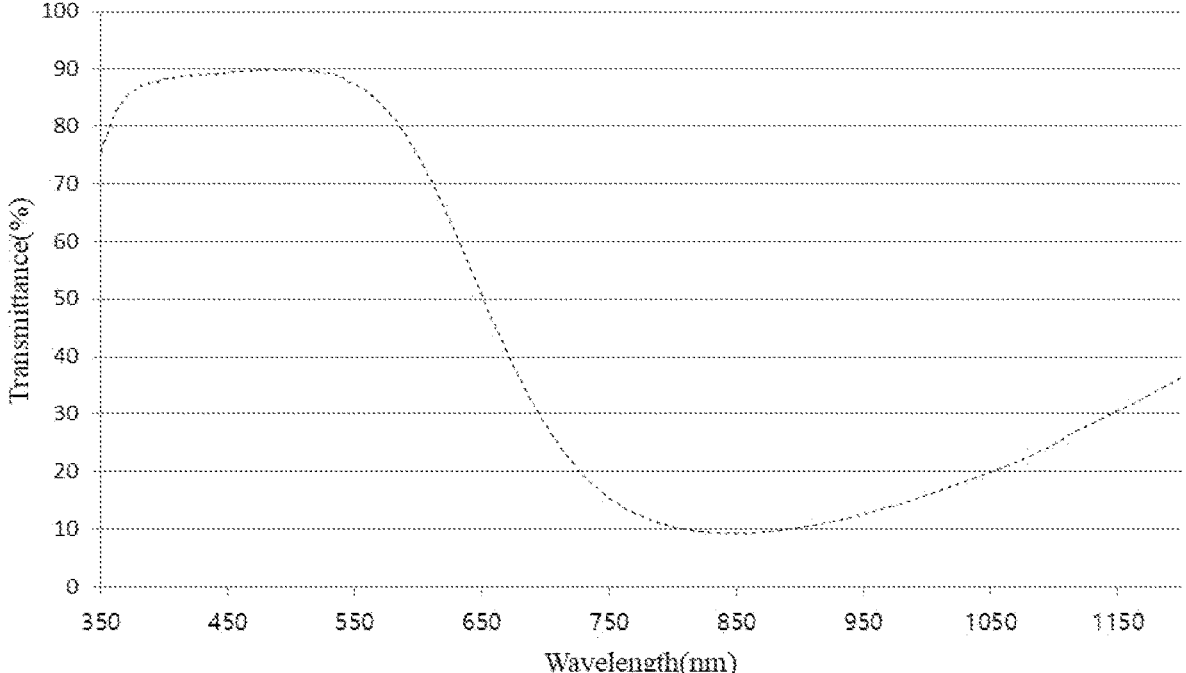
FIG. 5 is a transmittance spectrum of an infrared absorbing substrate applied in Embodiment.

Various embodiments and terms used in the specification are not intended to limit the technical features described in the specification to specific embodiments, but it should be understood to include various modifications, equivalents, or substitutions of the embodiments. In connection with the description of the drawings, similar reference numerals may be used for similar or related components. The singular form of the noun corresponding to the item may include one or more of the elements unless the relevant context clearly dictates otherwise.

Embodiments will be described with reference to the associating drawings. In describing the present embodiment, the same names and the same reference numerals are used for the same components, and an additional description thereof will be omitted. In addition, in describing the embodiment of the present invention, the same names and reference numerals are used for components having the same functions, and it is substantially not completely the same as in the prior art.

According to various embodiments, terms such as "comprise" or "have" are intended to designate the presence of a feature, number, step, operation, component, part, or combination described in the specification. It should be understood, however, that the above does not preclude the possibility of addition or existence of one or more of other features, or numbers, steps, operations, components, parts, or combinations.

For those physical properties mentioned in the present invention where the result of measuring temperature may affect, it is measured at room temperature unless otherwise specified. The term "room temperature" used in the present invention refers to a natural temperature that is not heated or not reduced, for example, it means any temperature within the range of 10° C. to 30° C., a temperature of about 23° C. or about 25° C. In addition, in the present specification, the unit of temperature is Celsius (° C.) unless otherwise specified.

The term "atmospheric pressure" is a natural pressure that is not pressurized or depressurized. It usually means about 1 atmosphere of atmospheric pressure having the value of about 740 mmHg to 780 mmHg. In the case of a physical property in which the measured humidity affects the result, the physical property is a physical property measured at natural humidity that is not specifically controlled at the room temperature and/or atmosphere pressure.

In the case where an optical characteristic (e.g., refractive index) referred to in the present invention is a characteristic that varies depending on the wavelength, the optical characteristic is a result obtained for light having a wavelength of 520 nm unless otherwise specified.

The term "transmittance" or "reflectance" used in the present invention means an actual transmittance (measured transmittance) or an actual reflectance (measured reflectance) confirmed at a specific wavelength unless otherwise specified.

The term "transmittance" or "reflectance" used in the present invention is a value measured using an ultraviolet and visible spectrophotometer and means the transmittance or the reflectance for light at an incident angle of 0° based on the normal of the measurement target surface unless the incident angle is specifically specified.

In the present invention, the term "average transmittance" is a result of obtaining an arithmetic average of the measured transmittance after measuring transmittance of each wavelength while increasing the wavelength by 1 nm from the shortest wavelength within a predetermined wavelength region unless otherwise specified. For example, the average transmittance within the wavelength range of 350 nm to 360 nm is an arithmetic average of transmittance measured at the wavelength of 350 nm, 351 nm, 352 nm, 353 nm, 354 nm, 355 nm, 356 nm, 357 nm, 358 nm, 359 nm, and 360 nm.

In the present specification, the term "maximum transmittance" refers to the maximum transmittance when the transmittance of each wavelength is measured while increasing the wavelength by 1 nm from the shortest wavelength within a predetermined wavelength region. For example, the maximum transmittance within the wavelength range of 350 nm to 360 nm is the highest transmittance among transmittances measured at the wavelength of 350 nm, 351 nm, 352 nm, 353 nm, 354 nm, 355 nm, 356 nm, 357 nm, 358 nm, 359 nm, and 360 nm.

In the present invention, the term "average reflectance" is a result of obtaining an arithmetic average of the measured reflectance after measuring reflectance of each wavelength while increasing the wavelength by 1 nm from the shortest wavelength within a predetermined wavelength region unless otherwise specified. For example, the average reflectance within the wavelength range of 350 nm to 360 nm is an arithmetic average of reflectance measured at the wavelength of 350 nm, 351 nm, 352 nm, 353 nm, 354 nm, 355 nm, 356 nm, 357 nm, 358 nm, 359 nm, and 360 nm.

In the present specification, the term "maximum reflectance" refers to the maximum reflectance when the reflectance of each wavelength is measured while increasing the wavelength by 1 nm from the shortest wavelength within a predetermined wavelength region. For example, the maximum reflectance within the wavelength range of 350 nm to 360 nm is the highest reflectance among reflectance measured at the wavelength of 350 nm, 351 nm, 352 nm, 353 nm, 354 nm, 355 nm, 356 nm, 357 nm, 358 nm, 359 nm, and 360 nm.

The term "incident angle" used in the present invention is an angle normal to a surface to be evaluated. For example, a transmittance at an incident angle of 0° of the optical filter means the transmittance for light incident in a direction parallel to the normal of the optical filter surface. Also, a transmittance at an incident angle of 40° is the transmittance for the incident light forming an angle of 40° in the clockwise or the counterclockwise direction with respect to the normal of the optical filter surface. This definition of the incident angle is equally applied to other characteristics such as transmittance.

The optical filter layer of the present invention can efficiently and accurately block ultraviolet light near the short-wavelength visible light region and the infrared light near the long-wavelength visible light region and implement a visible light transmission band with high transmittance. The optical filter of the present invention may include a transparent substrate, and a so-called infrared absorbing substrate may be applied as the transparent substrate. The infrared absorbing substrate is a substrate that exhibits absorption characteristics in at least a part of the infrared region. A so-called blue glass exhibiting the above characteristics by including copper is a representative example of the infrared absorbing substrate. Such an infrared absorbing substrate is useful in constructing an optical filter that blocks light in the infrared region but is disadvantageous in securing high transmittance in the visible region due to the absorption characteristics. Further, the infrared absorbing substrate conventionally has poor durability. In the present invention, it is possible to provide an optical filter that exhibits high transmittance characteristics in the visible light region while efficiently blocking light in a desired ultraviolet and infrared region by selecting an infrared absorbing substrate and combining it with a specific dielectric film.

For the infrared absorbing substrate, a substrate having an average transmittance of 75% or more within the range of 425 nm to 560 nm may be used. For another example, the average transmittance may be within the range of 77% or more, 79% or more, 81% or more, 83% or more, 85% or more, 87% or more, or 89% or more and/or 98% or less, 96% or less, 94% or less or 92% or less, or 90% or less.

For the infrared absorbing substrate, a substrate having a maximum transmittance of 80% or more within a range of 425 nm to 560 nm may be used. For another example, the maximum transmittance may be within the range of 82% or more, 84% or more, 86% or more, 88% or more, or 90% and/or 100% or less, 98% or less, 96% or less, or 94% or less, 92% or less, or 90% or less.

For the infrared absorbing substrate, a substrate having an average transmittance of 75% or more within a range of 350 nm to 390 nm may be used. For another example, the average transmittance may be within the range of 77% or more, 79% or more or 81% or more and/or 98% or less, 96% or less, 94% or less, 92% or less, 90% or less, 88% or less, 86% or less or 84% or less.

For the infrared absorbing substrate, a substrate having a maximum transmittance of 80% or more within a range of 350 nm to 390 nm may be used. For another example, the maximum transmittance may be within the range of 82% or more, 84% or more or 86% or more and/or 100% or less, 98% or less, 96% or less, 94% or less, 92% or less, 90% or less or 88% or less.

As the infrared absorbing substrate, a substrate having a transmittance of 10% to 45% at a wavelength of 700 nm may be used. For another example, the transmittance may be within the range of 43% or less, 41% or less, 39% or less, 37% or less, 35% or less, 33% or less, 31% or less, or 29% or less, or 12% or more, 14% or more, 16% or less or more, 18% or more, 20% or more, 22% or more, 24% or more, 26% or more, or 28% or more.

As the infrared absorbing substrate, a substrate having an average transmittance within a range of 5% to 30% within a range of 700 nm to 800 nm may be used. For another example, the average transmittance may be within the range of 7% or more, 9% or more, 11% or more, 13% or more, 15% or more, 15.5% or more, 16% or more, or 16.5% or more and/or 28% or less, 26% or less, 24% or less, 22% or less, 20% or less, 18% or less, or 17% or less.

As the infrared absorbing substrate, a substrate exhibiting a maximum transmittance within a range of 10% to 45% within a range of 700 nm to 800 nm may be used. For another example, the maximum transmittance may be within the range of within the range of 12% or more, 14% or more, 16% or more, 18% or more, 20% or more, 22% or more, 24% or more, 26% or more, or 28% or more and/or 43% or less, 41% or less, 39% or less, 37% or less, 35% or less, 33% or less, 31% or less, or 29% or less.

As the infrared absorbing substrate, a substrate exhibiting an average transmittance in the range of 3% to 20% within the range of 800 nm to 1,000 nm can be used. For another example, the average transmittance may be further adjusted within the range of 5% or more, 7% or more, 9% or more or 11% or more and/or 18% or less, 16% or less, 14% or less, or 12% or less.

As the infrared absorbing substrate, a substrate exhibiting maximum transmittance in the range of 5% to 30% in the range of 800 nm to 1,000 nm may be used. For another example, the maximum transmittance may be within the range of 7% or more, 9% or more, 11% or more, 13% or more, or 15% or more, and/or 28% or less, 26% or less, 24% or less, 22% or less, 20% or less, 18% or less, or 16% or less.

As the infrared absorbing substrate, a substrate exhibiting an average transmittance in the range of 10% to 50% within the range of 1,000 nm to 1,200 nm may be used. For another example, the average transmittance may be further adjusted within the range of 12% or more, 14% or more, 16% or more, 18% or more, 20% or more, 22% or more, 24% or more, or 25% or more and/or 48% or less, 46% or less, 44% or less, 42% or less, 40% or less, 38% or less, 36% or less, 34% or less, 32% or less, 30% or less, 28% or less, or 26% or less.

The infrared absorbing substrate may have a transmission band exhibiting a maximum transmittance of 10% to 70% within a range of 1000 nm to 1200 nm. For another example, the maximum transmittance may be within the range of 12% or more, 14% or more, 16% or more, 18% or more, 20% or more, 22% or more, 24% or more, 26% or more, 28% or more, 30% or more, 32% or more, 34% or more, or 36% or more and/or 68% or less, 66% or less, 64% or less, 62% or less, 60% or less, 58% or less, 56% or less, 54% or less, 52% or less, 50% or less, 48% or less, 46% or less, 44% or less, 42% or less, 40% or less, 38% or less, or 37% or less.

The infrared absorbing substrate having the above characteristics can be combined with a dielectric film of the present invention to form a desired optical filter. As such a substrate, a substrate known as a so-called infrared absorbing glass can be used. Such glass is an absorption type glass manufactured by adding CuO or the like to a fluorophosphate-based glass or phosphate-based glass. Therefore, for one example in the present invention, for the infrared absorbing substrate, a CuO-containing fluorophosphate glass substrate or a CuO-containing phosphate glass substrate may be used. In the above, the phosphate glass includes silicophosphate glass where a part of the structure of the glass is composed of $SiO_2$. Such absorption-type glass is known, and for example, so a glass disclosed in Korean Patent Registration No. 10-2056613 or other commercially available absorption-type glass (e.g., commercially available products such as Hoya, Short, PTOT) may be used.

This infrared absorbing substrate contains copper. In the present invention, a substrate where the copper amount is in the range of 1% by weight ("weight %") to 7 weight % may be used. At this time, the method for measuring the copper amount is summarized in the examples of the present specification. For another example, the copper amount may be 1.5 weight % or more, 2 weight % or more, 2.5 weight % or more, 2.6 weight % or more, 2.7 weight % or more, or 2.8 weight % or more or 6.5 weight % or less, 6 weight % or less, 5.5 weight % or less, 5 weight % or less, 4.5 weight % or less, 4 weight % or less, 3.5 weight % or less, 3 weight % or less, or 2.9 weight %.

A substrate having such a copper amount tends to exhibit the above-described optical characteristics, and thus it can form an optical filter having desired characteristics in combination with a dielectric film described later. The thickness of the infrared absorbing substrate may be adjusted within a range of, for example, about 0.03 mm to about 5 mm, but is not limited to the number.

The optical filter of the present invention may include dielectric films on both sides of the infrared absorbing substrate. For convenience, in the following specification, one of the dielectric films formed on both sides of the infrared absorbing substrate may be referred to as a first dielectric film, and the other may be referred to as a second dielectric film. For one example, between the two types of dielectric films, a dielectric film having a smaller V value described below may be referred to as a first dielectric film, and a dielectric film having a larger V value may be referred to as a second dielectric film.

The infrared absorbing substrate may include a first dielectric film formed on a first surface and a second dielectric film formed on a second surface. In the above, the first surface means any one main surface of the infrared absorbing substrate and the second surface means another main surface of the infrared absorbing substrate opposite to the first surface.

FIG. 1 is an exemplary structure of such an optical filter, and it is a case where the dielectric films 201 and 202 are formed on both surfaces of the infrared absorption substrate 100. The first and second dielectric films may have a multilayer structure including at least two sub-layers having different refractive indices, respectively, and it may include a multilayer structure where the two sub-layers are repeatedly stacked. For example, the first dielectric film may include a structure where first and second sub-layers having different refractive indices are repeatedly stacked and the second dielectric film may include a structure where third and fourth sub-layers having different refractive indices are repeatedly stacked.

The first and second sub-layers are the sub-layers distinguished by difference in refractive indices and the third and fourth sub-layers are also the sub-layers distinguished by difference in refractive indices. Accordingly, as long as the refractive index of the second sub-layer is different from that of the first sub-layer, the first sub-layer may be made of the same material as the third or fourth sub-layer, and this is also the case for the second to fourth sub-layers.

In general, a dielectric film is a film formed by repeatedly stacking dielectric material with a low refractive index and dielectric material with a high refractive index and it is used to form a so-called IR reflective layer and an AR (anti-reflection) layer. A dielectric film may be applied for forming the conventional AR layer or IR reflective layer in the present invention.

The desired optical filter can be provided by adjusting the formation of the dielectric film in relation to the infrared absorbing substrate. For example, in the optical filter of the present invention, the sum $(V_1+V)$ of the V value $(V_1)$ of the first dielectric film according to Equation 1 and the V value $(V_2)$ of the second dielectric film according to Equation 1 below may be in the range of 15 to 50.

$$V = \log\left[\left\{\left(\frac{(R\times Cu)^{2p}}{n_2} + K\right)^2\right\} + \left\{\frac{(R\times Cu)^{2p}}{n_2} - K\right\}\right].\quad\text{[Equation 1]}$$

In Equation 1, R is the ratio $(n_1/n_2)$ of the refractive index $(n_1)$ of the sub-layer having a larger refractive index among the first and second sub-layers with respect to the refractive index $(n_2)$ of the sub-layer having a lower refractive index among the first and second sub-layers for a case where the V value of the first dielectric film is confirmed. The ratio $(n_1/n_2)$ of the refractive index $(n_1)$ of the sub-layer having a larger refractive index among the third and fourth sub-layers with respect to the refractive index $(n_2)$ of the sub-layer having a lower refractive index among the third and fourth sub-layers for a case where the V value of the second dielectric film is confirmed.

In Equation 1, $n_2$ is the refractive index of a sub-layer $(n_2)$ having a lower refractive index among the first and second sub-layers for the case where the V value of the first dielectric film is confirmed and $n_2$ is the refractive index of a sub-layer $(n_2)$ having a lower refractive index among the third and fourth sub-layers for the case where the V value of the second dielectric film is confirmed. In Equation 1, Cu is the amount of copper included in the infrared absorbing substrate.

In Equation 1, K is the total number of layers of the first and second sub-layers in the first dielectric film for the case where the V value of the first dielectric film is confirmed. K is the total number of layers of the third and fourth sub-layers in the second dielectric film for the case where the V value of the second dielectric film is confirmed, and 2p is K−1.

The first and second sub-layers confirming the V value of Equation 1 are sub-layers that form a repeatedly stacked structure of sub-layers having different refractive indices in the first dielectric film and the total number of the first and second sub-layers may be at least 50% or more, 55% or more, 60% or more, 65% or more, 70% or more, 75% or more, 80% or more, 85% or more, 90% or more or 95% or more of the total number of entire sub-layers in the first dielectric film. The upper limit of the ratio of the total number of the first and second sub-layers to the total number of entire sub-layers shall not be limited and it may be, for example, 100% or less or less than 100%. In other words, the first dielectric film may include only the first and second sub-layers or it may include other sub-layers.

The third and fourth sub-layers confirming the V value of Equation 1 are sub-layers that form a repeatedly stacked structure of sub-layers having different refractive indices in the second dielectric film and the total number of the third and fourth sub-layers may be at least 50% or more, 55% or more, 60% or more, 65% or more, 70% or more, 75% or more, 80% or more, 85% or more, 90% or more or 95% or more of the total number of entire sub-layers in the second dielectric film. The upper limit of the ratio of the total number of the third and fourth sub-layers to the total number of entire sub-layers shall not be limited and it may be, for example, 100% or less or less than 100%. In other words, the second dielectric film may include only the third and fourth sub-layers or it may include other sub-layers.

The sum of the V values $(V_1+V_2)$ may be, for another example, 17 or more, 19 or more, 21 or more, 23 or more, 25 or more, 27 or more, or 29 or more, 48 or less, 46 or less, 44 or less, 42 or less, 38 or less, 36 or less, 34 or less, 32 or less, or 30 or less.

For the optical filter, the ratio, $V_2/V_1$, of the V value of the second dielectric film $(V_2)$ to the V value $(V_1)$ of the first dielectric film may be within a range of 4 to 12. For another example, the ratio, $V_2/V_1$, may be 4.5 or more, 5 or more, or 5.5 or more, 6 or more, 6.5 or more or, 7 or more, or 7.5 or more or 11.5 or less, 11 or less, 10.5 or less, 9.5 or less, 9 or less, 8.5 or less, or 8 or less.

The dielectric film formed to satisfy such a condition may provide an optical filter that does not cause problems such as ripple and petal flare while exhibiting desired blocking and transmission characteristics by supplementing or improving the insufficient characteristics of the infrared absorbing substrate. Moreover, it is possible to provide the optical filter with excellent durability.

Consequently, the V value in Equation 1 is proportional to the difference in refractive index between the first sub-layer and the second sub-layer or between the third sub-layer and the fourth sub-layer, the amount of copper in the substrate and the total number of the first sub-layer and the second sub-layer or the third sub-layer and the fourth sub-layer, and is inversely proportional to the refractive index of the sub-layer having the lower refractive index between the first and second sub-layers or between the third and fourth sub-layers. The factors affecting the V value affect to each transmission and reflection characteristics of individual components of the optical filter.

For example, as the amount of copper in the substrate increases, the absorption characteristic of the substrate itself in a long wavelength region increases and a sharper decrease in transmittance from a wavelength of approximately 550 nm is shown. Accordingly, if the amount of copper in the substrate is increased, it is advantageous for blocking light in the long wavelength region, but the increased amount of copper deteriorates durability of the substrate. Furthermore, the difference in refractive index between the first sub-layer and the second sub-layer (or the third sub-layer and the fourth sub-layer), the total number of layers of the first and second sub-layers (or the third sub-layer and the fourth sub-layer) and the refractive index of the lower refractive index sub-layer between the first and second sub-layers (or the third and fourth sub-layers) affects the transmission and reflection characteristics of each dielectric film.

In the present invention, by combining the substrate and the dielectric film to become the sum of the V values of the first and second dielectric films in the range of 15 to 50 and the ratio of both V values $V_2/V_1$ in the range of 4 to 12, it is possible for each element (the substrate and the dielectric film) in the optical filter to maximize the contributing portion for showing the desired optical characteristics of the optical filter and to supplement with other element while eliminating the characteristics of one element that may adversely affect the characteristics of the optical filter. Accordingly, in the present invention, an optical filter with excellent durability and its use can be provided such that ultraviolet ray and infrared ray is effectively blocked, high transmittance is shown in visible light, the characteristics are stably maintained even when the incident angle is changed, and problems such as ripple and petal flare are not shown.

For example, if the optical filter is configured such that the sum of the V values of the first and second dielectric films is excessively large, problems such as decreasing in durability of the optical filter and/or decreasing in transmittance in the visible light region may occur or the efficiency of using light may be deteriorated because the optical filter blocks light of a usable long wavelength in the visible light region. Moreover, if the optical filter is configured such that the sum of the V values of the first and second dielectric films is too small, the light blocking efficiency of the long wavelength region of the optical filter is reduced and a local increasing in transmittance may occur at some regions (e.g., 700 nm to 800 nm) in the long wavelength region supposed to be blocked.

If the ratio of the V values of the first and second dielectric films is excessively decreased or increased, problems such as decreasing in the durability of the optical filter and/or decreasing in transmittance in the visible light region may occur or the efficiency of using light may be deteriorated because the optical filter blocks light of a usable long wavelength in the visible light region. Or the light blocking efficiency of the long wavelength region of the optical filter is reduced and/or a local increasing in transmittance may occur at some regions (e.g., 700 nm to 800 nm) in the long wavelength region.

For example, in Equation 1, the ratio $(n_1/n_2)$ of the refractive index $(n_1)$ of the high refractive index layer to the refractive index $(n_2)$ of the low refractive index layer among the first and second sub-layers or the third and fourth sub-layers may be in the range of about 1.4 to 2.0. For another example, the ratio may be about 1.45 or more, 1.5 or more, 1.55 or more, 1.6 or more, 1.65 or more, 1.7 or more, or 1.75 or more, or 1.95 or less, 1.9 or less, 1.85 or less, or 1.8 or less.

In Equation 1, the refractive index $(n_1)$ of the high refractive index layer among the first and second sub-layers or the third and fourth sub-layers may be in the range of about 1.8 to 3.5. For another example, the refractive index $n_1$ may be 2.0 or more, 2.2 or more, 2.4 or more, 2.5 or more or 2.55 or more or about 3.3 or less, 3.1 or less, 2.9 or less or 2.7 or less.

In Equation 1, the refractive index $(n_2)$ of the low refractive index layer among the first and second sub-layers or the third and fourth sub-layers may be in the range of about 1.1 to 1.7. For another example, the refractive index $n_2$ may be 1.2 or more, 1.3 or more or 1.4 or more or 1.65 or less, 1.6 or less, 1.55 or less or about 1.5 or less.

Cu of Equation 1, in other words, the amount of copper included in the infrared absorbing substrate may be in the range of 1 weight % to 7 weight % as described above. When calculating the V value of Equation 1, only the number is substituted while ignoring the unit of the copper amount. In other words, the V value of Equation 1 may be dimensionless. Cu in Equation 1 may be, for another example, 1.5 weight % or more, 2 weight % or more, 2.5 weight % or more, 2.6 weight % or more, 2.7 weight % or more, or 2.8 weight % or more or 6.5 weight % or less, 6 weight % or less, 5.5 weight % or less, 5 weight % or less, 4.5 weight % or less, 4 weight % or less, 3.5 weight % or less, 3 weight % or less, or 2.9 weight %.

For the case of the first dielectric film, K determining 2p in Equation 1, in other words, the total number of layers of the first sub-layer and the second sub-layer (the number of layers of the first sub-layer+the number of layers of the second sub-layer) may be 17 or less, 16 or less, 15 or less, 14 or less, 13 or less, 12 or less, 11 or less, 10 or less, 9 or less, 8 or less, 7 or less, or 6 or less and for another example, it can be 2 or more, 3 or more, 4 or more, 5 or more, or 6 or more. The first dielectric film may include a repeatedly stacked structure of the first and second sub-layers, and thus, in this case, the number of layers of each of the first and second sub-layer is the same as each other or either one may have one or two more layers. The total number of sub-layers included in the first dielectric film may be 20 or less, 19 or less, 18 or less, 17 or less, 16 or less, 15 or less, 14 or less, 13 or less, 12 or less, 11 or less, 10 or less, 9 or less, 8 or less, 7 or less, or 6 or less, and for another example it can be 2 or more, 3 or more, 4 or more, 5 or more, or 6 or more.

For the case of the second dielectric film, K determining 2p in Equation 1, in other words, the total number of layers of the third and fourth sub-layers (the number of layers of the third sub-layer+the number of layers of the fourth sub-layer) may be 60 or less, 58 or less, 56 or less, 54 or less, 52 or less, 50 or less, 48 or less, 46 or less, 44 or less, 42 or less, 40 or less, or 39 or less or 10 or more, 12 or more, 13 or more, 14 or more, 16 or more, 18 or more, 20 or more, 22 or more, 24 or more, 26 or more, 28 or more, 30 or more, 32 or more, 34 or more, 36 or more, or 38 or more. The second dielectric film may include a repeatedly stacked structure of the third and fourth sub-layers, and thus, in this case, the number of layers of each of the third and fourth sub-layer is the same as each other or either one may have one or two more layers. The total number of sub-layers included in the second dielectric film may be, for example, 70 or less, 68 or less, 66 or less, 64 or less, 62 or less, 60 or less, 58 or less, and 56 or less, 54 or less, 52 or less, 50 or less, 48 or less, 46 or less, 44 or less, 42 or less, 40 or less or 39 or less or 10 or more, 12 or more, 13 or more, 14 or more, 16 or more, 18 or more, 20 or more, 22 or more, 24 or more, 26 or more, 28 or more, 30 or more, 32 or more, 34 or more, 36 or more, or 38 or more.

The thickness of each of the first and second sub-layers in the first dielectric film may be adjusted according to the purpose of usage but it may be in the range of approximately 5 nm to 200 nm. For another example, the thickness may be 10 nm or more, 15 nm or more, 20 nm or more, 25 nm or more, 30 nm or more, 35 nm or more, 40 nm or more, 45 nm or more, 50 nm or more, 55 nm or more, 60 nm or more, 65 nm or more, 70 nm or more, 75 nm or more, 80 nm or more, or 85 nm or more or 190 nm or less, 180 nm or less, 170 nm or less, 160 nm or less, 150 nm or less, 140 nm or less, 130 nm or less, 120 nm or less, 110 nm or less, 100 nm or less, 90 nm or less, 80 nm or less, 70 nm or less, 60 nm or less, 50 nm or less, 40 nm or less, 30 nm or less, 20 nm or less, or 15 nm or less.

An average value (arithmetic mean) of the thicknesses of the first sub-layers and the second sub-layers included in the first dielectric film may be in a range of about 10 nm to 100 nm. For another example, the average value may be 15 nm or more, 20 nm or more, 25 nm or more, 30 nm or more, or 35 nm or more or 95 nm or less, 90 nm or less, 85 nm or less, 80 nm or less, 75 nm or less, 70 nm or less, 65 nm or less, 60 nm or less, 55 nm or less, 50 nm or less, 45 nm or less or 40 nm or less.

As stated above, the total thickness of the first dielectric film may be in the range of about 100 nm to about 500 nm. For another example, the thickness may be within the range of 120 nm or more, 140 nm or more, 160 nm or more, 180 nm or more, or 200 nm or more or 480 nm or less, 460 nm or less, 440 nm or less, 420 nm or less, 400 nm or less or 380 nm or less, 360 or less, 320 or less, 300 or less, 280 or less, 260 or less, 240 or less, or 220 or less.

For the first dielectric film, one surface may be formed as the first sub-layer and the other surface may be formed as the second sub-layer in a stacked structure including the first and second sub-layers alternately. For example, the surface of the first dielectric film on the infrared absorbing substrate of the stacked structure may be formed of the first sub-layer or the second sub-layer and the surface on the opposite side may be formed of the second sub-layer or the first sub-layer. However, the stacking order may be changed.

The thickness of each of the third and fourth sub-layers in the second dielectric film may be adjusted according to the purpose of usage but it may be within the range of approximately 1 nm to 300 nm. For another example, the thickness may be 5 nm or more, 10 nm or more, 15 nm or more, 20 nm or more, 25 nm or more, 30 nm or more, 35 nm or more, 40 nm or more, 45 nm or more, 50 nm or more, 55 nm or more, 60 nm or more, 65 nm or more, 70 nm or more, 75 nm or more, 85 nm or more, 90 nm or more, 95 nm or more, 100 nm or more, 105 nm or more, 110 nm or more, 115 nm or more, 120 nm or more, 125 nm or more, 130 nm or more, 135 nm or more, 140 nm or more, 145 nm or more, 150 nm or more, 155 nm or more, 160 nm or more, 165 nm or more, 170 nm or more, 175 nm or more, or 180 nm or more or 290 nm or less, 280 nm or less, 270 nm or less, 260 nm or less, 250 nm or less, 240 nm or less, 230 nm or less, 220 nm or less, 210 nm or less, 200 nm or less or 190 nm or less, 180 or less, 170 or less, 160 or less, 150 or less, 140 or less, 130 or less, 120 or less, 110 or less, 100 or less, 90 or less, 80 or less, 70 or less, 60 or less, 50 or less, 40 or less, 30 or less, 20 or less, 15 or less or less, or 10 or less.

An average value (arithmetic average) of the thicknesses of the third sub-layers and the thicknesses of the fourth sub-layers included in the second dielectric film may be within the range of about 80 nm to about 200 nm. For another example, the average value may be 85 nm or more, 90 nm or more, 95 nm or more, 100 nm or more, 105 nm or more, 110 nm or more, 115 nm or more, or 120 nm or more or 195 nm or less, 190 nm or less, 185 nm or less, 180 nm or less, 175 nm or less, 170 nm or less, 165 nm or less, 160 nm or less, 155 nm or less, 150 nm or less, 145 nm or less, 140 nm or less, 135 nm or less, 130 nm or less, or 125 nm or less.

The total thickness of the second dielectric film may be within the range of about 3,000 nm to about 6,000 nm. For another example, the thickness may be 3,500 nm or more, 4,000 nm or more, 4,500 nm or more, or 5,500 nm or more or 5,500 nm or less, 5,000 nm or less, or 4,800 nm or less.

Both surfaces of the second dielectric film may be formed of the same sub-layer in a stacked structure including the third and fourth sub-layers alternately. For example, a layer having a high refractive index or a layer having a low refractive index among the third and fourth sub-layers may be formed on both surfaces. However, the stacking order may be changed.

For one example, the V value—$V_1$ for the first dielectric film in Equation 1 may be in the range of 1 to 10. For another example, $V_1$ may be 1.5 or more, 2 or more, 2.5 or more, or 3 or more or 9 or less, 8 or less, 7 or less, 6 or less, 5 or less, or 4 or less.

For one example, the V value—$V_2$ for the second dielectric film in Equation 1 may be in the range of 10 to 60. For another example, $V_2$ may be 12 or more, 14 or more, 16 or more, 18 or more, 20 or more, 22 or more, or 24 or more or 58 or less, 56 or less, 54 or less, 52 or less, 50 or less, 48 or less, 46 or less, 44 or less, 42 or less, 40 or less, 38 or less, 36 or less, 34 or less, 32 or less, 30 or less, 28 or less, or 27 or less. The first and second dielectric films having the above characteristics may secure desired optical characteristics together with the infrared absorbing substrate.

The material for forming the first or second dielectric films, in other words, the kind of material for forming each of the sub-layer is not particularly limited and a known material may be applied. Usually, $SiO_2$ or fluoride such as $Na_5Al_3F_{14}$, $Na_3AlF_6$ or $MgF_2$ may be applied for the preparation of the low refractive sub-layer and $TiO_2$, $Ta_2O_5$, $Nb_2O_5$, ZnS or ZnSe may be applied for the preparation of the high refractive sub-layer. However, the material applied in the present invention may not be limited to it.

To obtain appropriate effects, one of the first and second dielectric films may use a dielectric film having stronger reflection characteristics than the other dielectric film. For example, the second dielectric film may have higher reflection characteristics than the first dielectric film.

The first dielectric film may exhibit an average reflectance of 2% or less within the range of 425 nm to 560 nm. For another example, the average reflectance may be within the range of 0% or more, 0.1% or more, or 0.2% or more and/or 1.8% or less, 1.6% or less, 1.4% or less, 1.2% or less, 1% or less, 0.8% or less, 0.6% or less, 0.4 or less, or 0.3% or less.

The first dielectric film may exhibit a maximum reflectance of 2% or less within the range of 425 nm to 560 nm. For another example, the maximum reflectance may be within the range of 0% or more, 0.1% or more, 0.2% or more, 0.3% or more and/or 1.8% or less, 1.6% or less, 1.4% or less, 1.2% or less, 1% or less, 0.8% or less or 0.6% or less, or 0.4% or less.

The first dielectric film may exhibit an average reflectance of 30% or less within the range of 350 nm to 390 nm. For another example, the average reflectance may be within the range of 1% or more, 2% or more, 3% or more, 4% or more, 5% or more, or 5.5% or more and/or 28% or less, 26% or less, 24% or less, 22% or less, 20% or less, 18% or less, 16% or less, 14% or less, 12% or less, 10% or less, 8% or less, or 6% or less.

The first dielectric film may exhibit a maximum reflectance of 40% or less within the range of 350 nm to 390 nm. For another example, the maximum reflectance may be within the range of 2% or more, 4% or more, 6% or more, 8% or more, 10% or more, 12% or more, or 14% or more and/or 38% or less, 36% or more, 34% or less, 32% or less, 30% or less, 28% or less, 26% or less, 24% or less, 22% or less, 20% or less, 18% or less, 16% or less, or 15% or less.

For the first dielectric film, a substrate having a reflectance of 10% or less at a wavelength of 700 nm may be used. For another example, the reflectance may be 9% or less, 8% or less, 7% or less, 6% or less, 5% or less, 4% or less, 3% or less, or 2.5% or less or 0% or more, 0.5% or more, 1% or more, 1.5% or more, or 2% or more.

The first dielectric film may exhibit an average reflectance of 10% or less within the range of 700 nm to 800 nm. For another example, the average reflectance may be within the range of 9% or less, 8% or less, 7% or less, 6% or less, or 5% or less and/or 0% or more, 0.5% or more, 1% or more, 1.5% or more, 2% or more, 2.5% or more, 3% or more, 3.5% or more, 4% or more, or 4.5% or more.

The first dielectric film may exhibit a maximum reflectance of 15% or less within the range of 700 nm to 800 nm. For another example, the maximum reflectance may be within the range of 14% or less, 13% or less, 12% or less, 11% or less, 10% or less, 9% or less, 8% or less, or 7.5% or less and/or 0% or more, 1%, 2% or more, 3% or more, 4% or more, 5% or more, 6% or more, or 7% or more.

The first dielectric film may exhibit an average reflectance of 30% or less within a range of 800 nm to 1,000 nm. For another example, the average reflectance may be further adjusted within the range of 0% or more, 2% or more, 4% or more, 6% or more, 8% or more, 10% or more, or 12% or more and/or 28% or less, 26% or less, 24% or less, 22% or less, 20% or less, 18% or less, 16% or less, 14% or less, or 13% or less.

The first dielectric film may exhibit a maximum reflectance of 30% or less within the range of 800 nm to 1,000 nm. For another example, the maximum reflectance may be within the range of 0% or more, 2% or more, 4% or more, 6% or more, 8% or more, 10% or more, 12% or more, 14% or more, or 16% or more, and/or 28% or less, 26% or less, 24% or less, 22% or less, 20% or less, 18% or less, 17% or less, or 16.5% or less.

The first dielectric film may exhibit an average reflectance of 30% or less within a range of 1,000 nm to 1,200 nm. For another example, the average reflectance may be further adjusted within the range of 0% or more, 2% or more, 4% or more, 6% or more, 8% or more, 10% or more, 12% or more, 14% or more, 16% or more, or 18% or more and/or 28% or less, 26% or less, 24% or less, 22% or less, 20% or less, or 19% or less.

The first dielectric film may exhibit a maximum reflectance of 30% or less within a range of 1,000 nm to 1,200 nm. For another example, the maximum reflectance may be within the range of 0% or more, 2% or more, 4% or more, 6% or more, 8% or more, 10% or more, 12% or more, 14% or more, 16% or more, 18% or more, or 20% or more and/or 28% or less, 26% or less, 24% or less, 22% or less, or 21% or less.

The first dielectric layer may exhibit an average reflectance of 10% or less within a range of 600 nm to 900 nm. For another example, the average reflectance may be within the range of 9% or less, 8% or less, 7% or less, 6% or less, or 5.5% or less and/or 0% or more, 0.5% or more, 1% or more, 1.5% or more, 2% or more, 2.5% or more, 3% or more, 3.5% or more, 4% or more, 4.5% or more, or 5% or more.

The first dielectric layer may exhibit a maximum reflectance of 25% or less within a range of 600 nm to 900 nm. For another example, the maximum reflectance may be within the range of 24% or less, 23% or less, 22% or less, 21% or less, 20% or less, 19% or less, 18% or less, 17% or less, 16% or less, 15% or less, 14% or less, or 13% or less and/or 0% or more, 1% or more, 2% or more, 3% or more, 4% or more, 5% or more, 6% or more, 7% or more, 8% or more, 9% or more, 10% or more, 11% or more, or 12% or more.

The second dielectric film may exhibit an average reflectance of 2% or less within the range of 425 nm to 560 nm. For another example, the average reflectance may be in the range of 0% or more, 0.1% or more, 0.2% or more, 0.3% or more, or 0.4% or more and/or 1.5% or less, 1% or less, or 0.5% or less.

The second dielectric film may exhibit a maximum reflectance of 4% or less within the range of 425 nm to 560 nm. For another example, the maximum reflectance may be within the range of 0% or more, 0.5% or more, 1% or more, 1.2% or more or 1.4% or more and/or 3.5% or less, 3% or less, 2.5% or less or 2% or less.

The second dielectric film may exhibit an average reflectance of 75% or more within the range of 350 nm to 390 nm. For another example, the average reflectance may be within the range of 80% or more, 85% or more, 90% or more or 94% or more and/or 98% or less, 96% or less or 95% or less.

The second dielectric film may exhibit a maximum reflectance of 80% or more within the range of 350 nm to 390 nm. For another example, the maximum reflectance may be within the range of 85% or more, 90% or more or 95% or more and/or 100% or less.

The second dielectric film may have a reflectance of 30% or less at a wavelength of 700 nm. For another example, the reflectance may be 28% or less, 26% or less, 24% or less, 22% or less, 20% or less, 18% or less, 16% or less, 14% or less, 12% or less, 10% or less, 8% or less, 6% or less, 4% or less, 2% or less, or 1% or less or 0% or more, 0.1% or more, 0.2% or more, 0.3% or more or 0.4% or more, 0.5% or more, 0.6% or more, or 0.7% or more.

The second dielectric film may exhibit an average reflectance of 50% or more within the range of 700 nm to 800 nm. For another example, the average reflectance may be within the range of 52% or more, 54% or more, 56% or more, 58% or more, 60% or more, 62% or more, 64% or more, 66% or more, 68% or more, 70% or more, 72% or more, 74% or more, 76% or more, 78% or more, 80% or more, 82% or more, 84% or more, or 86% or more and/or 95% or less, 93% or less, 91% or less, 89% or less, or 87% or less.

The second dielectric film may exhibit a maximum reflectance of 50% or more within the range of 700 nm to 800 nm. For another example, the maximum reflectance may be within the range of 52% or more, 54% or more, 56% or more, 58% or more, 60% or more, 62% or more, 64% or more, 66% or more, 68% or more, 70% or more, 72% or more, 74% or more, 76% or more, 78% or more, 80% or more, 82% or more, 84% or more, 86% or more, 88% or more, 90% or more, 92% or more, 94% or more, 96% or more, 98% or more, or 99% or more and/or 100% or less or less than 100%.

The second dielectric film may exhibit an average reflectance of 80% or more within the range of 800 nm to 1,000 nm. For other example, the average reflectance may be within the range of 82% or more, 84% or more, 86% or more, 88% or more, 90% or more, 92% or more, 94% or more, 96% or more, 98% or more or 99% or more and/or 100% or less or less than 100%.

The second dielectric film may exhibit a maximum reflectance of 80% or more within the range of 800 nm to 1,000 nm. For another example, the maximum reflectance may be within the range of 82% or more, 84% or more, 86% or more, 88% or more, 90% or more, 92% or more, 94% or more, 96% or more, 98% or more or 99% or more and/or 100% or less or less than 100%.

For the second dielectric film, a substrate having an average reflectance of 80% or more within the range of 1,000 nm to 1,200 nm may be used. For another example, the average reflectance may be within the range of 82% or more, 84% or more, 86% or more, 88% or more, 90% or more, 92% or more, 94% or more, 96% or more, 98% or more or 99% or more and/or 100% or less or less than 100%.

The second dielectric film may have a transmission band exhibiting a maximum reflectance of 80% or more within the range of 1,000 nm to 1,200 nm. For another example, the maximum reflectance may be within the range of 82% or more, 84% or more, 86% or more, 88% or more, 90% or more, 92% or more, 94% or more, 96% or more, 98% or more or 99% or more and/or 100% or less or less than 100%.

The second dielectric layer may have the longest wavelength that exhibits a reflectivity of 50% within a wavelength range of 350 nm to 425 nm in a range of 400 nm to 426 nm. For another example, the longest wavelength may be 401 nm or more, 402 nm or more, 403 nm or more, 404 nm or more, 405 nm or more, 406 nm or more, 407 nm or more, 408 nm or more, 409 nm or more, 410 nm or more, 411 nm or more, 412 nm or more, 413 nm or more, or 414 nm or more, or 423 nm or less, 421 nm or less, 419 nm or less, 417 nm or less, or 415 nm or less.

The second dielectric layer may exhibit an average reflectance of 80% or less within the range of 600 nm to 900 nm. For another example, the average reflectance may be within the range of 78% or less, 76% or less, 74% or less, 72% or less, 70% or less, 68% or less, 66% or less, 64% or less, or 63% or less and/or 10% or more, 15% or more, 20% or more, 25% or more, 30% or more, 35% or more, 40% or more, 45% or more, 50% or more, 55% or more, or 60% or more.

The second dielectric layer may exhibit a maximum reflectance of 50% or more within a range of 600 nm to 900 nm. For another example, the maximum reflectance may be within the range of 52% or more, 54% or more, 56% or more, 58% or more, 60% or more, 62% or more, 64% or more, 66% or more, 68% or more, 70% or more, 72% or more, 74% or more, 76% or more, 78% or more, 80% or more, 82% or more, 84% or more, 86% or more, 88% or more, 90% or more, 92% or more, 94% or more, 96% or more, 98% or more, or 99% or more and/or 100% or less or less than 100%.

The second dielectric layer may have the shortest wavelength that exhibits a reflectance of 50% within the wavelength range of 600 nm to 900 nm in a range of 690 nm to 750 nm. For another example, the shortest wavelength may be 692 nm or more, 694 nm or more, 696 nm or more, 698 nm or more, 700 nm or more, 702 nm or more, 704 nm or more, 706 nm or more, 708 nm or more, 710 nm or more, or 712 nm or more, or 748 nm or less, 746 nm or less, 744 nm or less, 742 nm or less, 740 nm or less, 738 nm or less, 736 nm or less, 734 nm or less, 732 nm or less, 730 nm or less, 728 nm or less, 726 nm or less, 724 nm or less, 722 nm or less, 720 nm or less, 718 nm or less, 716 nm or less, 714 nm or less, or 713 nm or less.

For another example, the second dielectric film may not have a wavelength exhibiting a reflectance of 50% within the wavelength range of 600 nm to 900 nm. In this case, the second dielectric layer may have a maximum transmittance of less than 50% in a wavelength range of 600 nm to 900 nm.

The reflectance of the first or second dielectric film may be a value measured when each dielectric film is formed on a transparent substrate (SCHOTT, D263) or a value measured on an optical filter. In other words, when the first dielectric film is the outermost of the optical filter, the reflectance can be measured from the first dielectric film side of the optical filter and the reflectance of the second dielectric film can also be measured on the optical filter in the same manner.

For another example, the optical filter may have an average reflectance of 70% or less in the wavelength range of 600 nm to 900 nm, and the shortest wavelength exhibiting a reflectance of 50% within the wavelength range of 600 nm to 900 nm is 690 nm to 750 nm (the first case) or a maximum reflectance within a wavelength range of 600 nm to 900 nm may be less than 50% (the second case). The reflectance characteristics of the optical filter may be measured on a surface of the optical filter where the first dielectric film is formed or the surface of the optical filter where the second dielectric film is formed.

For the first case, the average reflectance within the range of 600 nm to 900 nm of the optical filter may be within the range of 68% or less, 66% or less, 64% or less, or 63% or less and/or 10% or more, 15% or more, 20% or more, 25% or more, 30% or more, 35% or more, 40% or more, 45% or more, 50% or more, 55% or more, or 60% or more for another example. For the first case, the optical filter may exhibit a maximum reflectance of at least 50% within the range of 600 nm to 900 nm. For another example, the maximum reflectance may be within the range of 52% or more, 54% or more, 56% or more, 58% or more, 60% or more, 62% or more, 64% or more, 66% or more, 68% or more, 70% or more, 72% or more, 74% or more, 76% or more, 78% or more, 80% or more, 82% or more, 84% or more, 86% or more, 88% or more, 90% or more, 92% or more, 94% or more, 96% or more, 98% or more, or 99% or more and/or 100% or less or less than 100%.

For the first case, the optical filter may have the shortest wavelength that exhibits a reflectance of 50% within the wavelength range of 600 nm to 900 nm in a range of 690 nm to 750 nm. The shortest wavelength may be 692 nm or more, 694 nm or more, 696 nm or more, 698 nm or more, 700 nm or more, 702 nm or more, 704 nm or more, 706 nm or more, 708 nm or more, 710 nm or more, or 712 nm or more, or 748 nm or less, 746 nm or less, 744 nm or less, 742 nm or less, 740 nm or less, 738 nm or less, 736 nm or less, 734 nm or less, 732 nm or less, 730 nm or less, 728 nm or less, 726 nm or less, 724 nm or less, 722 nm or less, 720 nm or less, 718 nm or less, 716 nm or less, 714 nm or less, or 713 nm or less.

For the second case, the optical filter may have a maximum reflectance within a wavelength range of 600 nm to 900 nm of less than 50%, 48% or less, 46% or less, 44% or less, 42% or less, 40% or less, 38% or less, 36% or less, 34% or less, 32% or less, 30% or less, 28% or less, 26% or less, 24% or less, 22% or less, 20% or less, 18% or less, 16% or less, or 14% or less or 8% or more, 10% or more, 12% or more, 14% or more, 16% or more, 18% or more, 20% or more, 22% or more, 24% or more, 26% or more, 28% or more, or 30% or more.

The reflection characteristic of the optical filter within the wavelength range of 600 nm to 900 nm is a result measured from the surface where the first dielectric film of the optical filter is present or the surface where the second dielectric film of the optical filter is present. In general, since the layer present in the optical filter is relatively thin and in the case of a substrate, there is little or no reflection characteristic. Thus, the reflection characteristic measured from the surface where the first dielectric film is present, and the reflection characteristic measured from the surface where the second dielectric film is present is almost similar.

By controlling the reflection characteristics as described above, the so-called petal flare phenomenon can be prevented. In other words, it may be considered that one of the reasons of the petal flare phenomenon is that the reflection of near-infrared light is repeated in the image capturing device where the optical filter is mounted. In this case, the petal flare phenomenon can be prevented by controlling the reflection characteristics of the first and/or second dielectric film and/or the optical filter as described above.

A method of forming the dielectric film as described above is not particularly limited and, for example, it may be formed by applying a known deposition method. In the industry, a method of controlling the reflection and transmission characteristics of the dielectric film in consideration of the deposition thickness or the number of sub-layers is known and thus, the first and second dielectric films showing the above characteristics are formed according to the known method in the present invention. Also, the reflectance of the surface of the second dielectric film of the optical filter can be adjusted by controlling the characteristics of the dielectric film.

The optical filter may further include various optional layers as long as the transparent substrate, the infrared absorbing substrate and the dielectric film are basically included. For example, the optical filter may further include an absorption layer formed on one or both surfaces of the transparent substrate and/or the dielectric film. The absorption layer is a light absorption layer, for example, a layer that absorbs light within a wavelength range of at least a part of an infrared and/or ultraviolet region. One or two layers or more of the absorption layer may be formed on the optical filter.

Figure 3:
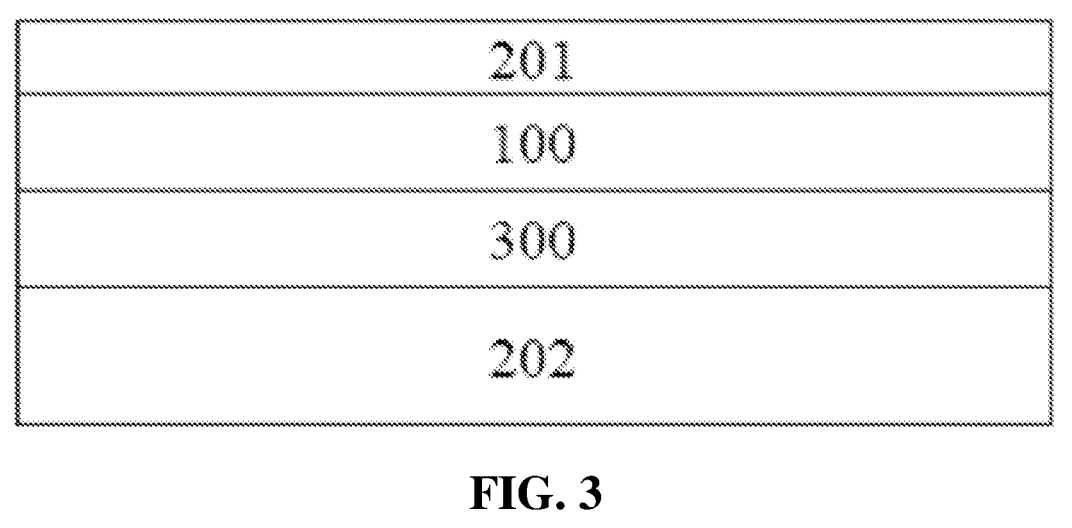

FIGS. 2 to 4 are views illustrating a case where the absorption layers 300, 301, and 302 are formed in the optical filter of FIG. 1. As in FIGS. 2 to 4, the absorption layer may be formed in one layer or two layers or more between the infrared absorption substrate 100 and the first and/or second dielectric films 201 and 202.

For one example, the absorption layer may be an infrared absorption layer and/or an ultraviolet absorption layer. The absorption layer may also be a layer having both infrared absorbing and ultraviolet absorbing properties. These layers are generally layers containing an absorbent (pigment, dye, etc.) and a transparent resin and they may be applied to implement a sharper transmittance band by cutting light in the near-ultraviolet and/or near-infrared region.

For one example, the ultraviolet absorption layer may be designed to exhibit a maximum absorption in the wavelength range of about 300 nm to 390 nm and the infrared absorption layer may be designed to exhibit a maximum absorption in the wavelength range of 600 nm to 800 nm. For one example, when the light absorption layer is a layer exhibiting both ultraviolet and infrared absorptivity, the light absorption layer can be designed to simultaneously exhibit an absorption band in the wavelength region of about 300 nm to 390 nm and an absorption band in the wavelength region of 600 nm to 800 nm.

The infrared absorption layer and the ultraviolet absorption layer may be configured as one layer or they may be configured as separate layers, respectively. For example, one layer may be designed to exhibit both the absorption maxima of the ultraviolet absorption layer and the absorption maxima of the infrared absorption layer or two layers showing the respective absorption maxima may be formed. In addition, a plurality of infrared absorption layers and/or ultraviolet absorption layers may be present.

Each absorption layer may contain only one kind of absorbent and it may contain two or more kinds of absorbents for proper cutting of infrared and/or ultraviolet, if necessary. For example, the infrared absorption layer may include a first absorbent having a maximum absorption wavelength in the range of 700 nm to 720 nm and a full width at half maximum (FWHM) in the range of 50 nm to 60 nm; and a second absorbent having a maximum absorption wavelength in the range of 730 nm to 750 nm, a full width at half maximum (FWHM) in the range of 60 nm to 70 nm. The ultraviolet absorption layer may include a absorbent having a maximum absorption wavelength in the range of 340 nm to 390 nm.

The infrared absorption layer and the ultraviolet absorption layer may be configured as one layer. Materials and configuration methods constituting the absorption layer are not particularly limited and known materials and configuration methods can be applied. Usually, the absorption layer is formed by using a material where a transparent resin and an absorbent (such as dye or pigment) capable of exhibiting a desired maximum absorption are blended.

For example, as the ultraviolet absorbent, a known absorbent exhibiting a maximum absorption in the wavelength region of about 300 nm to 390 nm may be applied. Exemplary ultraviolet absorbents may include ABS 407 manufactured by Exiton; UV381A, UV381B, UV382A, UV386A and VIS404A from QCR Solutions Corp; HW Sands' ADA1225, ADA3209, ADA3216, ADA3217, ADA3218, ADA3230, ADA5205, ADA3217, ADA2055, ADA6798, ADA3102, ADA3204, ADA3210, ADA2041, ADA2323201, ADA3202, ADA3215, ADA3225, ADA3268, ADA3202, ADA3215, ADA26, ADA3219, ADA3, ADA7226, ADA4634, ADA3213, ADA3227, ADA5922, ADA5950, ADA6752, ADA7130, ADA8212, ADA2984, ADA2999, ADA3220, ADA3228, ADA3235, ADA3240, ADA3211, ADA3221, ADA5220 and ADA7158; and CRYSTALYN's DLS 381B, DLS 381C, DLS 382A, DLS 386A, DLS 404A, DLS 405A, DLS 405C and DLS 403A, etc., but are not limited thereto.

As the infrared absorbent, an appropriate dye or pigment exhibiting a maximum absorption in the wavelength region of 600 nm to 800 nm may be used. For example, a squarylium-based dye, a cyanine-based compound, a phthalocyanine-based compound, a naphthalocyanine-based compound or a dithiol metal complex-based compound may be used, but are not limited thereto.

Known resins may also be used for the transparent resin applied to the absorption layer. For example, one of more resins selected from cyclic olefin resin, polyarylate resin, polysulfone resin, polyether sulfone resin, polyparaphenylene resin, polyarylene ether phosphine oxide resin, polyimide resin, polyetherimide resin, polyamideimide resin, acrylic resin, polycarbonate resin, polyethylene naphthalate resin and various organic-inorganic hybrid resin may be used.

The optical filter of the present invention as described above may exhibit excellent optical properties along with excellent durability. For example, the optical filter may exhibit a transmission band having a T50% cut-on wavelength in the range of about 400 nm to 425 nm. The T50% cut-on wavelength is the shortest wavelength among wavelengths showing a transmittance of 50% within the wavelength range of 350 nm to 425 nm. One or two or more wavelengths showing the transmittance of 50% may exist within the range of 400 nm to 425 nm. If one exists, it becomes the T50% cut-on wavelength. If two or more exist, the shortest wavelength becomes the T50% cut-on wavelength. The T50% cut-on wavelength may be further adjusted within the range of 392 nm or above, 394 nm or above, 398 nm or above, 400 nm or above, 402 nm or above, 404 nm or above, 406 nm or above, 408 nm or above, 410 nm or above, 412 nm or above, 414 nm or above and/or 428 nm or less, 426 nm or less, 424 nm or less, 422 nm or less, 420 nm or less, 418 nm or less, 416 nm or less, or 414 nm or less.

The optical filter may exhibit a transmission band having a T50% cut-off wavelength in the range of about 590 nm to 680 nm. The T50% cut-off wavelength is the longest wavelength among wavelengths showing a transmittance of 50% within the wavelength range of 560 nm to 700 nm. One or two or more wavelengths showing the transmittance of 50% may exist within the range of 560 nm to 700 nm. If one exists, it becomes the T50% cut-off wavelength. If two or more exist, the longest wavelength becomes the T50% cut-off wavelength. The T50% cut-off wavelength may be further adjusted within the range of 592 nm or above, 594 nm or above, 596 nm or above, 598 nm or above, 600 nm or above, 602 nm or above, 604 nm or above, 606 nm or above, 608 nm or above, 610 nm or above, 612 nm or above, 614 nm or above, 616 nm or above, 618 nm or above, 620 nm or above, 622 nm or above, or 624 nm or above and/or 678 nm or less, 676 nm or less, 674 nm or less, 672 nm or less, 670 nm or less, 668 nm or less, 666 nm or less, 664 nm or less, 662 nm or less, 660 nm or less, 658 nm or less, 656 nm or less, 654 nm or less, 652 nm or less, 650 nm or less, 648 nm or less, 646 nm or less, 644 nm or less, 642 nm or less, 640 nm or less, 638 nm or less, 636 nm or less, 634 nm or less, 632 nm or less or 630 nm or less, 628 nm or less, 626 nm or less, or 624 nm or less.

The optical filter may have a transmission band exhibiting an average transmittance of 75% or more within the range of 425 nm to 560 nm. For another example, the average transmittance may be adjusted within the range of 77% or more, 79% or more, 81% or more, 83% or more, 85% or more, 87% or more, 89% or more, 91% or more, 92% or more or 92.5% or more or 98% or less, 96% or less, 94% or less, 93% or less, 92% or less, or 91.5% or less.

The optical filter of the present invention may have a transmission band exhibiting a maximum transmittance of 79% or more within the range of 425 nm to 560 nm. For another example, the maximum transmittance may be adjusted within the range of 81% or more, 83% or more, 85% or more, 87% or more, 89% or more, 91% or more, 93% or more, 94% or more, or 95% or more and/or 100% or less, 98% or less, 96% or less, 95% or less, or 94.5% or less.

The optical filter of the present invention may have a transmission band exhibiting an average transmittance of 2% or less within the range of 350 nm to 390 nm. For another example, the average transmittance may be further adjusted within the range of 0% or more, 0.1% or more, 0.2% or more, 0.3% or more, 0.4% or more, or 0.5% or more and/or 1.8% or less, 1.6% or less, 1.4% or less, 1.2% or less, 1.0% or less, 0.8% or less, 0.6% or less, 0.55% or less, or 0.5% or less.

The optical filter of the present invention may have a transmission band exhibiting a maximum transmittance of 10% or less within a range of 300 nm to 390 nm. For another example, the maximum transmittance may be further adjusted within the range of 0% or more, 0.5% or more, 1% or more, 1.5% or more, 2% or more, 2.5% or more, 3% or more, 3.5% or more, 4% or more and/or 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less or 3% or less.

The optical filter of the present invention may have a transmittance of 2% or less at a wavelength of 700 nm. For another example, the transmittance may be further adjusted within the range of 0% or more, 0.2% or more, 0.4% or more, 0.6% or more, 0.8% or more, 1% or more, or 1.2% or more and/or 1.8% or less, 1.6% or less, 1.4% or less, 1.2% or less or 1.0% or less.

The optical filter of the present invention may have a transmission band exhibiting an average transmittance of 2% or less within the range of 700 nm to 800 nm. For another example, the average transmittance may be further adjusted within the range of 0% or more or 0.1% or more and/or 1.8% or less, 1.6% or less, 1.4% or less, 1.2% or less, 1.0% or less, 0.8% or less, 0.6% or less, 0.5% or less, 0.4% or less, 0.3% or less, 0.2% or less, or 0.15% or less.

The optical filter of the present application may have a transmission band exhibiting a maximum transmittance of 5% or less within the range of 700 nm to 800 nm. For another example, the maximum transmittance may be further adjusted within the range of 0% or more, 0.2% or more, 0.4% or more, 0.6% or more, 0.8% or more, 1% or more or 1.2% or more and/or 4.5% or less, 4% or less, 3.5% or less, 3% or less, 2.5% or less, 2% or less, or 1.5% or less.

The optical filter of the present invention may have a transmission band exhibiting an average transmittance of 2% or less within the range of 800 nm to 1,000 nm. For another example, the average transmittance may be further adjusted within the range of 0% or more, 0.01% or more, 0.03% or more, 0.05% or more, 0.07% or more or 0.09% or more and/or 1.8% or less, 1.6% or less, 1.4% or less, 1.2% or less, 1.0% or less, 0.8% or less, 0.6% or less, 0.4% or less, 0.2% or less, 0.15% or less or 0.1% or less.

The optical filter of the present invention may have a transmission band exhibiting a maximum transmittance of 2% or less within the range of 800 nm to 1,000 nm. For another example, the maximum transmittance may be further adjusted within the range of 0% or more, 0.2% or more, 0.4% or more, 0.6% or more or 0.8% or more and/or 1.8% or less, 1.6% or less, 1.4% or less, 1.2% or less, 1.0% or less, 0.8% or less, 0.6% or less or 0.4% or less.

The optical filter of the present invention may have a transmission band exhibiting an average transmittance of 5% or less within the range of 1,000 nm to 1,200 nm. For another example, the average transmittance may be further adjusted within the range of 0% or more, 0.5% or more, 1% or more or 1.5% or more and/or 4.5% or less, 4% or less, 3.5% or less, 3% or less, 2.5% or less, 2% or less, 1.5% or less, 1% or less, 0.8% or less, 0.6% or less, 0.4% or less or 0.3% or less.

The optical filter of the present invention may have a transmission band exhibiting a maximum transmittance of 5% or less within the range of 1,000 nm to 1,200 nm. For another example, the maximum transmittance may be further adjusted within the range of 0% or more, 0.5% or more, 1% or more or 1.5% or more and/or 4.5% or less, 4% or less, 3.5% or less, 3% or less, 2.5% or less, 2% or less, 1.5% or less, 1% or less, 0.8% or less, 0.6% or less, 0.4% or less or 0.3% or less.

The optical filter of the present invention may be configured to have any one or a combination of two or more of the above optical characteristics, and it may suitably satisfy all of the above-described optical characteristics. The optical filter may also have excellent durability. For example, the optical filter may stably have the optical properties even after being maintained in high temperature and high humidity conditions for a long time.

Such durability can be confirmed according to Equation 2 below:

$$\Delta T = 100 \times (T_f - T_i)/T_i.$$ [Equation 2]

In Equation 2, $T_f$ is the optical characteristic after maintaining the optical filter at a temperature of 85° C. and a relative humidity of 85% for 120 hours. $T_i$ is the optical characteristic of the optical filter before maintaining at the temperature and humidity.

For example, in the optical filter, in Equation 2, $T_f$ is the T50% cut-on wavelength after being maintained at a temperature of 85° C. and a relative humidity of 85% for 120 hours, and $T_i$ is the T50% cut-on wavelength before being maintained at a temperature of 85° C. and a relative humidity of 85%. Then, the absolute value of $\Delta T$ in Equation 2 may be 20% or less. In this case, the absolute value of $\Delta T$ may be, for another example, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, or 1% or less or 0% or more, 0.5% or more, 1% or more, 1.5% or more, or 2% or more.

For example, in the optical filter, in Equation 2, $T_f$ is the T50% cut-off wavelength after being maintained at a temperature of 85° C. and a relative humidity of 85% for 120 hours, and $T_i$ is the T50% cut-off wavelength before being maintained at a temperature of 85° C. and a relative humidity of 85%. Then, the absolute value of $\Delta T$ in Equation 2 may be 20% or less. In this case, the absolute value of $\Delta T$ may be, for another example, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, or 1% or less or 0% or more, 0.5% or more, 1% or more, 1.5% or more, or 2% or more.

For example, in the optical filter, in Equation 2, $T_f$ is an average transmittance in the wavelength range of 425 nm to 560 nm of the optical filter after being maintained at a temperature of 85° C. and a relative humidity of 85% for 120 hours, and $T_i$ is an average transmittance in the wavelength range of 425 nm to 560 nm of the optical filter before being maintained at a temperature of 85° C. and a relative humidity of 85%. Then, the absolute value of $\Delta T$ in Equation 2 may be 20% or less. In this case, the absolute value of $\Delta T$ may be, for another example, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, or 1% or less or 0% or more, 0.5% or more, 1% or more, 1.5% or more, or 2% or more.

For example, in the optical filter, in Equation 2, $T_f$ is a maximum transmittance in the wavelength range of 425 nm to 560 nm of the optical filter after being maintained at a temperature of 85° C. and a relative humidity of 85% for 120 hours, and $T_i$ is a maximum transmittance in wavelength the range of 425 nm to 560 nm of the optical filter before being maintained at a temperature of 85° C. and a relative humidity of 85%. Then, the absolute value of $\Delta T$ in Equation 2 may be 20% or less. In this case, the absolute value of $\Delta T$ may be, for another example, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, or 1% or less or 0% or more, 0.5% or more, 1% or more, 1.5% or more, or 2% or more.

For example, in the optical filter, in Equation 2, $T_f$ is an average transmittance in the wavelength range of 350 nm to 390 nm of the optical filter after being maintained at a temperature of 85° C. and a relative humidity of 85% for 120 hours, and $T_i$ is an average transmittance in the wavelength range of 350 nm to 390 nm of the optical filter before being maintained at a temperature of 85° C. and a relative humidity of 85%. Then, the absolute value of $\Delta T$ in Equation 2 may be 20% or less. In this case, the absolute value of $\Delta T$ may be, for another example, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, or 1% or less or 0% or more, 0.5% or more, 1% or more, 1.5% or more, or 2% or more.

For example, in the optical filter, in Equation 2, $T_f$ is a maximum transmittance in the wavelength range of 350 nm to 390 nm of the optical filter after being maintained at a temperature of 85° C. and a relative humidity of 85% for 120 hours, and $T_i$ is a maximum transmittance in the wavelength range of 350 nm to 390 nm of the optical filter before being maintained at a temperature of 85° C. and a relative humidity of 85%. Then, the absolute value of $\Delta T$ in Equation 2 may be 20% or less. In this case, the absolute value of $\Delta T$ may be, for another example, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, or 1% or less or 0% or more, 0.5% or more, 1% or more, 1.5% or more, or 2% or more.

For example, in the optical filter, in Equation 2, $T_f$ is a transmittance at the wavelength of 700 nm of the optical filter after being maintained at a temperature of 85° C. and a relative humidity of 85% for 120 hours, and $T_i$ is a transmittance at the wavelength of 700 nm of the optical filter before being maintained at a temperature of 85° C. and a relative humidity of 85%. Then, the absolute value of $\Delta T$ in Equation 2 may be 20% or less. In this case, the absolute value of $\Delta T$ may be, for another example, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, or 1% or less or 0% or more, 0.5% or more, 1% or more, 1.5% or more, or 2% or more.

For example, in the optical filter, in Equation 2, $T_f$ is an average transmittance in the wavelength range of 700 nm to 800 nm of the optical filter after being maintained at a temperature of 85° C. and a relative humidity of 85% for 120 hours, and $T_i$ is an average transmittance in the wavelength range of 700 nm to 800 nm of the optical filter before being maintained at a temperature of 85° C. and a relative humidity of 85%. Then, the absolute value of $\Delta T$ in Equation 2 may be 20% or less. In this case, the absolute value of $\Delta T$ may be, for another example, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, or 1% or less or 0% or more, 0.5% or more, 1% or more, 1.5% or more, or 2% or more.

For example, in the optical filter, in Equation 2, $T_f$ is a maximum transmittance in the wavelength range of 700 nm to 800 nm of the optical filter after being maintained at a temperature of 85° C. and a relative humidity of 85% for 120 hours, and $T_i$ is a maximum transmittance in wavelength the range of 700 nm to 800 nm of the optical filter before being maintained at a temperature of 85° C. and a relative humidity of 85%. Then, the absolute value of $\Delta T$ in Equation 2 may be 20% or less. In this case, the absolute value of $\Delta T$ may be, for another example, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, or 1% or less or 0% or more, 0.5% or more, 1% or more, 1.5% or more, or 2% or more.

For example, in the optical filter, in Equation 2, $T_f$ is an average transmittance in the wavelength range of 800 nm to 1000 nm of the optical filter after being maintained at a temperature of 85° C. and a relative humidity of 85% for 120 hours, and $T_i$ is an average transmittance in the wavelength range of 800 nm to 1000 nm of the optical filter before being maintained at a temperature of 85° C. and a relative humidity of 85%. Then, the absolute value of $\Delta T$ in Equation 2 may be 20% or less. In this case, the absolute value of $\Delta T$ may be, for another example, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, or 1% or less or 0% or more, 0.5% or more, 1% or more, 1.5% or more, or 2% or more.

For example, in the optical filter, in Equation 2, $T_f$ is a maximum transmittance in the wavelength range of 800 nm to 1,000 nm of the optical filter after being maintained at a temperature of 85° C. and a relative humidity of 85% for 120 hours, and $T_i$ is a maximum transmittance in wavelength the range of 800 nm to 1,000 nm of the optical filter before being maintained at a temperature of 85° C. and a relative humidity of 85%. Then, the absolute value of $\Delta T$ in Equation 2 may be 20% or less. In this case, the absolute value of $\Delta T$ may be, for another example, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, or 1% or less or 0% or more, 0.5% or more, 1% or more, 1.5% or more, or 2% or more.

For example, in the optical filter, in Equation 2, $T_f$ is an average transmittance in the wavelength range of 1000 nm to 1200 nm of the optical filter after being maintained at a temperature of 85° C. and a relative humidity of 85% for 120 hours, and $T_i$ is an average transmittance in the wavelength range of 1000 nm to 1200 nm of the optical filter before being maintained at a temperature of 85° C. and a relative humidity of 85%. Then, the absolute value of $\Delta T$ in Equation 2 may be 20% or less. In this case, the absolute value of $\Delta T$ may be, for another example, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, or 1% or less or 0% or more, 0.5% or more, 1% or more, 1.5% or more, or 2% or more.

For example, in the optical filter, in Equation 2, $T_f$ is a maximum transmittance in the wavelength range of 1,000 nm to 1,200 nm of the optical filter after being maintained at a temperature of 85° C. and a relative humidity of 85% for 120 hours, and $T_i$ is a maximum transmittance in wavelength the range of 1,000 nm to 1,200 nm of the optical filter before being maintained at a temperature of 85° C. and a relative humidity of 85%. Then, the absolute value of $\Delta T$ in Equation 2 may be 20% or less. In this case, the absolute value of $\Delta T$ may be, for another example, 19% or less, 18% or less, 17% or less, 16% or less, 15% or less, 14% or less, 13% or less, 12% or less, 11% or less, 10% or less, 9% or less, 8% or less, 7% or less, 6% or less, 5% or less, 4% or less, 3% or less, 2% or less, or 1% or less or 0% or more, 0.5% or more, 1% or more, 1.5% or more, or 2% or more.

In addition to the above-described layers, the optical filter may additionally include various necessary layers within the scope that does not impair the desired effect. Below, the optical filter of the present invention will be described in detail through Embodiments. However, the scope of the optical filter of the present invention is not limited by the following Embodiments.

Evaluation of Transmittance or Reflectance Spectrum

The transmittance or the reflectance spectrum was measured using a spectrophotometer (Product Name: Lambda750 Spectrophotometer, manufactured by Perkin-Elmer) for a specimen obtained by cutting a measurement object to be 10 mm and 10 mm in length and width, respectively. The transmittance or the reflectance spectrum was measured for each wavelength and incident angle according to the manual of the equipment. The specimen was placed on a straight line between the measuring beam and the detector of the spectrophotometer, and the transmittance or reflectance spectrum was observed while changing the incident angle of the measuring beam from 0° to 40°. Unless specifically stated otherwise, the result of the transmittance or the reflectance spectrum in this embodiment is the result when the incident angle is 0°. The angle of incidence of 0° is a direction substantially parallel to the direction normal to the surface of the specimen.

The average transmittance or the average reflectance within a predetermined wavelength range in the transmittance or the reflectance spectrum is the transmittance or reflectance measured after measuring the transmittance or the reflectance of each wavelength while increasing the wavelength by 1 nm from the shortest wavelength in the wavelength range. It is a result of obtaining an arithmetic mean and the maximum transmittance or the maximum reflectance is the maximum transmittance or the maximum reflectance among transmittance or reflectance measured while increasing the wavelength by 1 nm. For example, the average transmittance within the wavelength range of 350 nm to 360 nm is at 350 nm, 351 nm, 352 nm, 353 nm, 354 nm, 355 nm, 356 nm, 357 nm, 358 nm, 359 nm, and 360 nm. It is the arithmetic mean of transmittance measured at a wavelength and the maximum transmittance within the wavelength range of 350 nm to 360 nm is 350 nm, 351 nm, 352 nm, 353 nm, 354 nm, 355 nm, 356 nm, 357 nm, 358 nm, It is the highest transmittance among transmittance measured at the wavelength of 359 nm and 360 nm.

Copper Amount Evaluation

The amount of copper in the glass substrate was confirmed using X-ray Fluorescence Spectrometry (WD XRF, Wavelength Dispersive X-Ray Fluorescence Spectrometry). When the X-rays is irradiated on a specimen (the glass substrate) using the equipment, the characteristic secondary X-rays is generated from individual elements of the specimen and the equipment detects the secondary X-rays according to the wavelength of each element. The intensity of the secondary X-rays is proportional to the element amount, and therefore, quantitative analysis can be performed through the intensity of the secondary X-rays measured according to the wavelength of each element.

Evaluation of Refractive Index

The refractive index of a sub-layer for a dielectric film was measured with respect to 520 nm wavelength using Ellipsometer (M-2000® Ellipsometer) from Wiz Optics Co.

Preparation Example 1: Preparation of Absorption Layer Material (A)

The absorption layer material (A) was prepared by using an absorbent (1) (triazine-based dye) exhibiting a maximum absorption within the range of about 340 nm to 390 nm; an infrared absorbent (2) (squarylium-based dye) having a maximum absorption wavelength in the range of about 700 nm to 720 nm and a full width at half maximum (FWHM) of about 50 nm to 60 nm; and an infrared absorbent (3) (squarylium-based dye) having a maximum absorption wavelength in the range of about 730 nm to about 750 nm and a full width at half maximum (FWHM) of about 60 nm to 70 nm. The absorption layer material (A) was prepared by mixing the absorbents (1) to (3) and a binder resin. For the binder resin, COP (Cyclo Olefin Polymer) was used. Based on 100 parts by weight of the binder resin, about 5 parts by weight of the absorbent (1), about 0.4 parts by weight of the absorbent (2), and about 0.5 parts by weight of the absorbent (3) are mixed with toluene. Thus, the absorption layer material (A) was prepared.

Preparation Example 2: Preparation of Absorption Layer Material (B)

The absorption layer material (B) was prepared by further blending an infrared absorbent (4) (Diimmonium-based dye) having a maximum absorption wavelength of about 1,050 nm to 1,150 nm with the absorption layer material (A). When blending, the infrared absorber (4) was added in an amount of about 0.8 parts by weight based on 100 parts by weight of the solid content of the absorption layer material (A).

Embodiment 1

For the infrared absorbing glass substrate, a phosphate-based infrared absorbing glass substrate (manufactured by HOYA) (thickness: about 0.21 mm) showing a transmittance spectrum in FIG. 5 was used. The copper amount measured for the infrared absorbing glass substrate was about 2.89 weight %. Spectral characteristics of the infrared absorbing glass substrate are summarized in Table 1 below. In Table 1, $T_{MAX}$ is the maximum transmittance within a corresponding wavelength range, the unit of which is %, and $T_{AVG}$ is the average transmittance within the corresponding wavelength range, the unit of which is %. In Table 1, T50% cut-on is the shortest wavelength (unit: nm) showing 50% transmittance within the wavelength range of 350 nm to 425 nm and T50% cut-off is the longest wavelength (unit: nm) that shows 50% transmittance within the wavelength range of 560 nm to 700 nm.

TABLE 1

|  |  | Infrared Absorbing Glass Substrate (Embodiment 1) |
| --- | --- | --- |
| 350 nm to 390 nm | $T_{MAX}$ | 87.7 |
|  | $T_{AVG}$ | 83.9 |

TABLE 1-continued

|  |  | Infrared Absorbing Glass Substrate (Embodiment 1) |
| --- | --- | --- |
| T50% cut-on | Wavelength (nm) | — |
| 425 nm to 560 nm | $T_{MAX}$ | 90.0 |
|  | $T_{AVG}$ | 89.3 |
| T50% cut-off | Wavelength (nm) | 651 |
| 700 nm | Transmittance (%) | 28.1 |
| 700 nm to 800 nm | $T_{MAX}$ | 28.1 |
|  | $T_{AVG}$ | 16.8 |
| 800 nm to 1,000 nm | $T_{MAX}$ | 15.9 |
|  | $T_{AVG}$ | 11.2 |
| 1,000 nm to | $T_{MAX}$ | 36.3 |
| 1,200 nm | $T_{AVG}$ | 25.3 |

The absorption layer material (A) of Preparation Example 1 was applied to one surface of the infrared absorption glass substrate and heat treatment was performed at 135° C. for 2 hours to form an absorption layer. The absorber layer had a thickness of about 3 µm. A first dielectric film was formed on the surface where the absorption layer was formed. The first dielectric film was formed by depositing a sub-layer using an ion-beam assisted deposition method. The vacuum level and temperature conditions during deposition were 5.0E-5 Torr and 120° C., respectively, and IBS (Ion Beam Sputtering) source voltage was set to 350 V and current 850 mA. The first dielectric film was formed by alternately forming a $TiO_2$ layer as a high refractive layer (refractive index of about 2.61) and a $SiO_2$ layer as a low refractive index layer (refractive index of about 1.46) in the above manner. The sub-layers, the high refractive layer and the low refractive layer, were formed in a total of 6 layers.

The thickness of each layer was adjusted as shown in Table 2 below. In Table 2, No. 1 is a layer formed first on the infrared absorbing glass and No. 6 is a layer formed last.

TABLE 2

| Layer Number | Material | Thickness (nm) |
| --- | --- | --- |
| 1 | $SiO_2$ | 85.3 |
| 2 | $TiO_2$ | 30.4 |
| 3 | $SiO_2$ | 13 |
| 4 | $TiO_2$ | 43.7 |
| 5 | $SiO_2$ | 30.3 |
| 6 | $TiO_2$ | 12.4 |

In such a first dielectric film, it is a dielectric film where R ($n_1/n_2$, where $n_1$ is the refractive index of $TiO_2$ (about 2.61) and $n_2$ is the refractive index of $SiO_2$ (about 1.46)) for the following Equation 1 is about 1.79, $n_2$ is about 1.46 (the refractive index of the $SiO_2$ layer), K is 6, and 2p is 5. Since Cu in the following Equation 1, the copper amount of the infrared absorbing glass substrate, is about 2.98 weight %, the V value of the following Equation A is about 3.4 when the first dielectric film is applied to the infrared absorbing glass substrate.

$$V = \log\left[\left\{\left(\frac{(R \times Cu)^{2p}}{n_2} + K\right)^2\right\} + \left\{\frac{(R \times Cu)^{2p}}{n_2} - K\right\}\right]. \quad \text{[Equation 1]}$$

Figure 6:
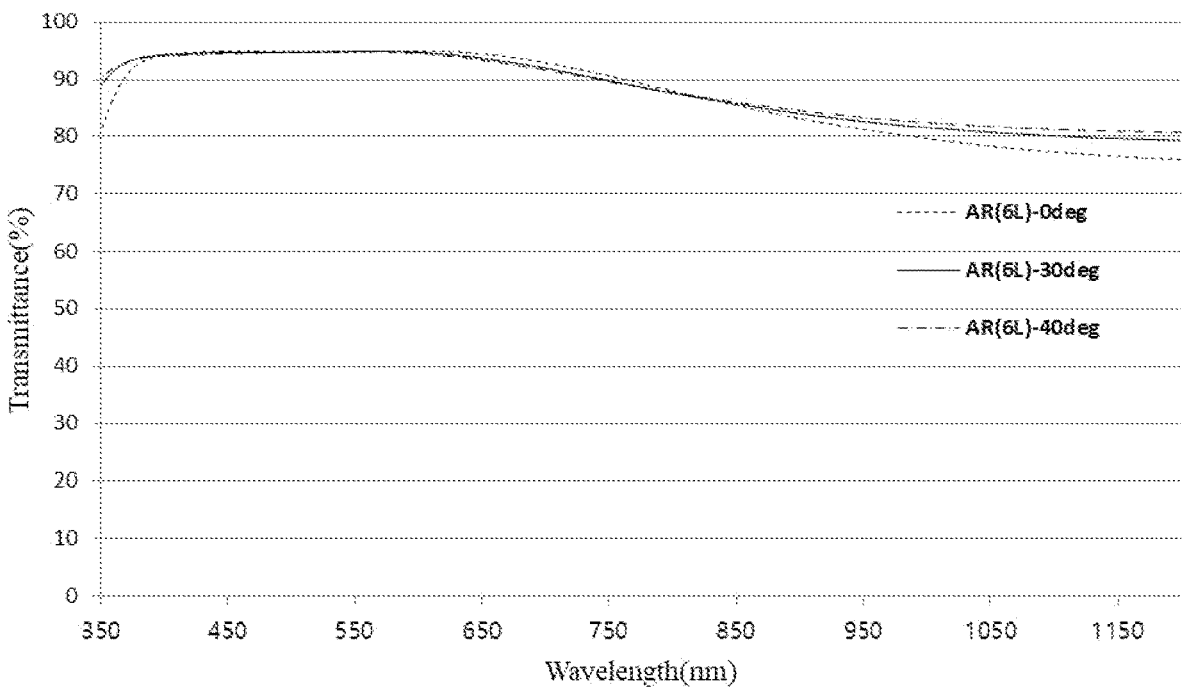
FIGS. 6, 8, and 13 are transmittance spectra of dielectric films applied in Embodiment or Comparative Examples.
Figure 7:
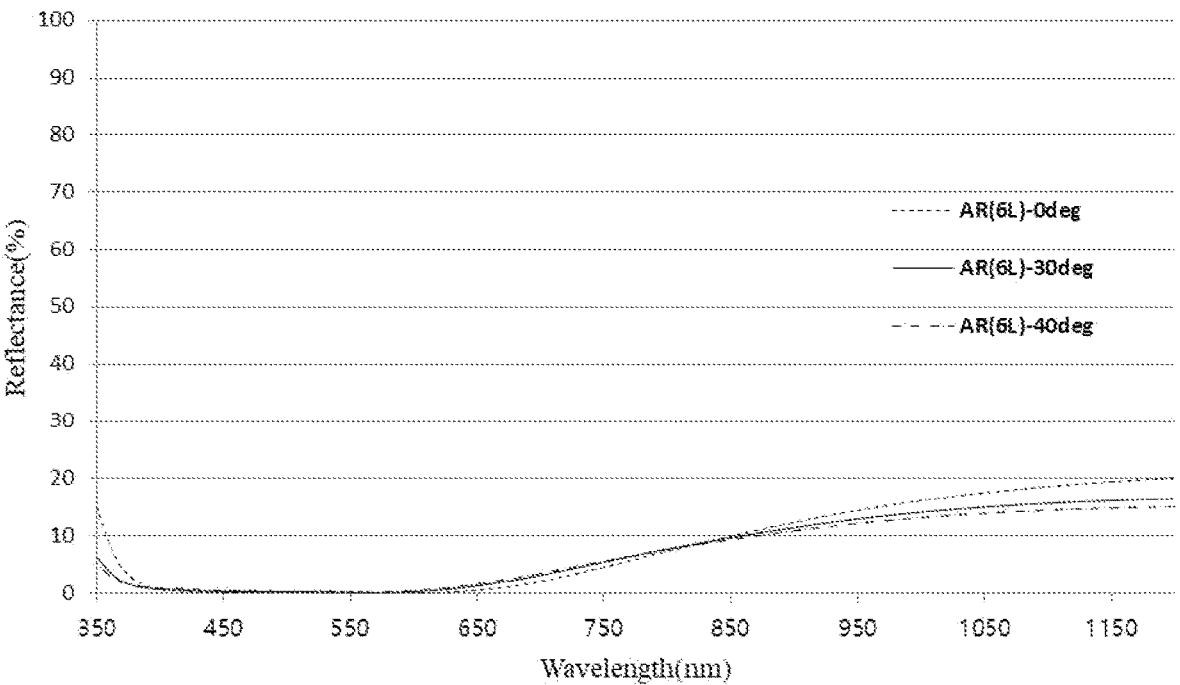
FIGS. 7, 9, 12, and 14 are reflectance spectra of dielectric films applied in Embodiment or Comparative Examples.

FIG. 6 is a spectrum showing the transmittance of the first dielectric film formed in the above manner and FIG. 7 is a spectrum showing the reflectance of the first dielectric film. The transmittance and the reflectance were measured after the first dielectric film was formed on a transparent substrate (SCHOTT, D263). In FIGS. 6 and 7, AR(6 L)-0 deg is the transmittance or the reflectance at an incident angle of 0°, AR(6 L)-30 deg is the transmittance or the reflectance at an incident angle of 30°, and AR(6 L)-40 deg is the transmittance or the reflectance at an incident angle of 40°.

The transmittance and the reflectance characteristics of FIGS. 6 and 7 are summarized in Table 3 below. In Table 3, $T_{MAX}$ is the maximum transmittance or the maximum reflectance within the corresponding wavelength region and the unit is %, and $T_{AVG}$ is the average transmittance or the average reflectance within the corresponding wavelength region and the unit is %.

In Table 3, T50% cut-on is the shortest wavelength (unit: nm) showing 50% transmittance or reflectance within the wavelength range of 350 nm to 425 nm. T50% cut-off is the shortest wavelength (unit: nm) showing 50% transmittance or reflectance within the wavelength range of 600 nm to 900 nm.

TABLE 3

| | | Transmittance (Incident Angle 0°) | Reflectance (Incidence angle 0°) |
|---|---|---|---|
| 350 nm to 390 nm | $T_{MAX}$ | 93.9 | 14.8 |
| | $T_{AVG}$ | 89.6 | 5.7 |
| T50% cut-on | Wavelength (nm) | — | — |
| 425 nm to 560 nm | $T_{MAX}$ | 95.0 | 0.3 |
| | $T_{AVG}$ | 94.8 | 0.2 |
| T50% cut-off | Wavelength (nm) | — | — |
| 700 nm | Transmittance (%) | 93 | 2.1 |
| 600 nm to 900 nm | $T_{MAX}$ | 95 | 12.4 |
| | $T_{AVG}$ | 90.2 | 5.1 |
| 700 nm to 800 nm | $T_{MAX}$ | 93 | 7.3 |
| | $T_{AVG}$ | 90.6 | 4.6 |
| 800 nm to 1,000 nm | $T_{MAX}$ | 88 | 16.1 |
| | $T_{AVG}$ | 83.5 | 12.1 |
| 1,000 nm to 1,200 nm | $T_{MAX}$ | 79.7 | 20.1 |
| | $T_{AVG}$ | 77.5 | 18.4 |

Next, the optical filter was prepared by forming a second dielectric film on the surface opposite to the surface on which the first dielectric film was formed of the infrared absorbing glass substrate. The second dielectric film was formed in the same manner as the first dielectric film. However, for the second dielectric film, a high refractive index layer of $TiO_2$ (refractive index about 2.61) and a low refractive index layer of $SiO_2$ layer (refractive index about 1.46) were alternately formed to make a total of 38 layers and the thickness of each layer is adjusted as shown in Table 4 below. In Table 4, No. 1 is a layer formed first on the infrared absorbing glass and No. 38 is a layer formed last.

TABLE 4

| Layer Number | Material | Thickness (nm) |
|---|---|---|
| 1 | $SiO_2$ | 86.96 |
| 2 | $TiO_2$ | 102.23 |
| 3 | $SiO_2$ | 176.39 |
| 4 | $TiO_2$ | 105.59 |
| 5 | $SiO_2$ | 180.6 |
| 6 | $TiO_2$ | 108.05 |
| 7 | $SiO_2$ | 181.06 |
| 8 | $TiO_2$ | 106.79 |
| 9 | $SiO_2$ | 182.24 |
| 10 | $TiO_2$ | 109.06 |
| 11 | $SiO_2$ | 181.22 |
| 12 | $TiO_2$ | 106.37 |
| 13 | $SiO_2$ | 179.79 |
| 14 | $TiO_2$ | 107.73 |
| 15 | $SiO_2$ | 177.66 |
| 16 | $TiO_2$ | 99.96 |

TABLE 4-continued

| Layer Number | Material | Thickness (nm) |
|---|---|---|
| 17 | $SiO_2$ | 159.94 |
| 18 | $TiO_2$ | 87.44 |
| 19 | $SiO_2$ | 153.19 |
| 20 | $TiO_2$ | 85.84 |
| 21 | $SiO_2$ | 148.89 |
| 22 | $TiO_2$ | 84.66 |
| 23 | $SiO_2$ | 147.6 |
| 24 | $TiO_2$ | 84.04 |
| 25 | $SiO_2$ | 148.13 |
| 26 | $TiO_2$ | 83.41 |
| 27 | $SiO_2$ | 148.35 |
| 28 | $TiO_2$ | 83.35 |
| 29 | $SiO_2$ | 148.02 |
| 30 | $TiO_2$ | 84.18 |
| 31 | $SiO_2$ | 148.08 |
| 32 | $TiO_2$ | 85.83 |
| 33 | $SiO_2$ | 150.08 |
| 34 | $TiO_2$ | 88.27 |
| 35 | $SiO_2$ | 159.77 |
| 36 | $TiO_2$ | 98.22 |
| 37 | $SiO_2$ | 37.87 |
| 38 | $TiO_2$ | 8.24 |

In the second dielectric film, it is a dielectric film where R ($n_1/n_2$, where $n_1$ is the refractive index of $TiO_2$ (about 2.61) and $n_2$ is the refractive index of $SiO_2$ (about 1.46)) for the Equation 1 is about 1.79, $n_2$ is about 1.46 (the refractive index of the $SiO_2$ layer), K is 38, and 2p is 37. Since Cu of Equation 1, the copper amount of the infrared absorbing glass substrate, is about 2.89 weight %, the V value of the Equation 1 when the second dielectric film is applied to the infrared absorbing glass substrate is about 26.22.

Figure 8:
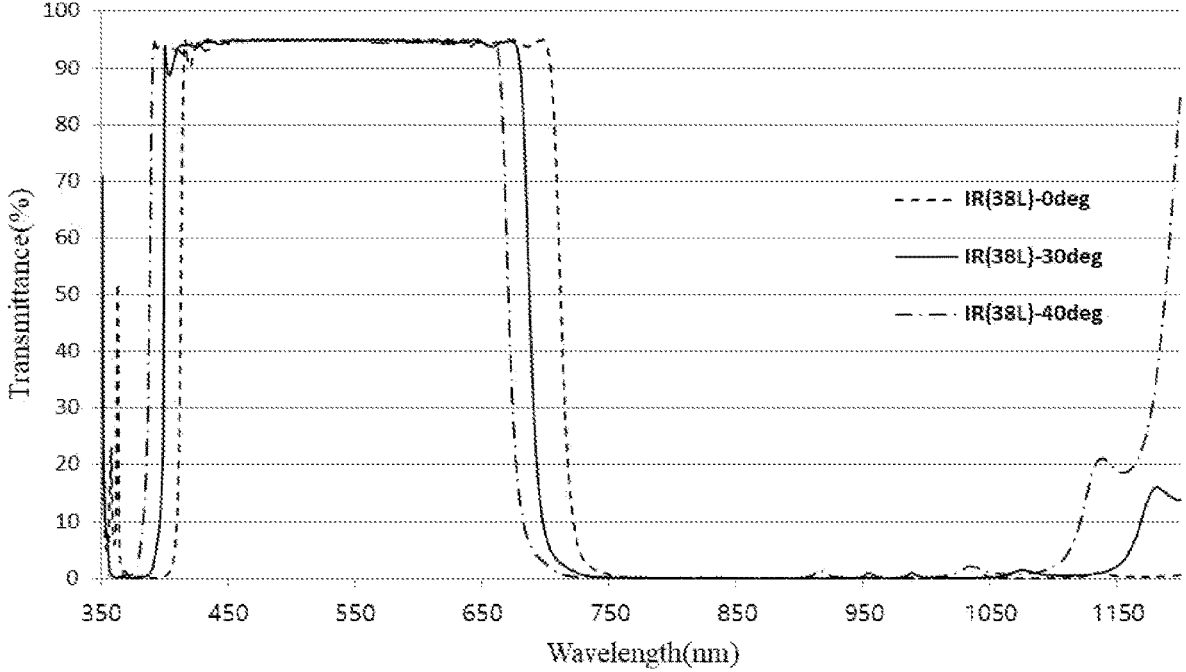
Figure 9:
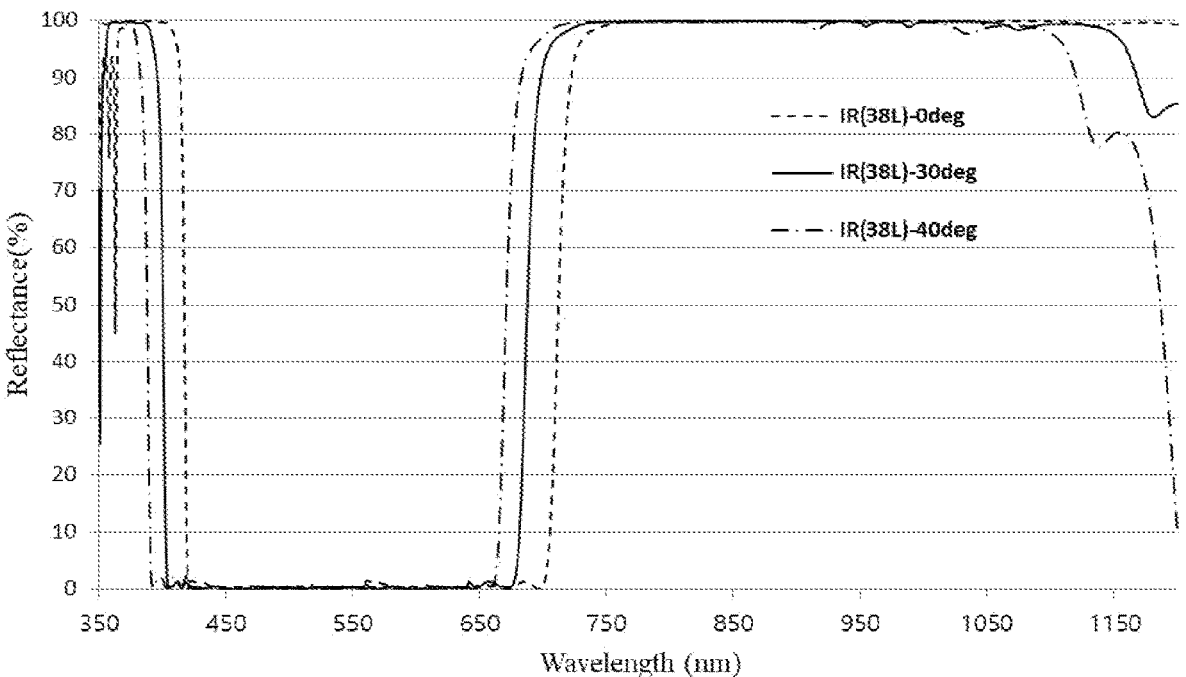

FIG. 8 is a spectrum of the transmittance of the second dielectric film formed in the same manner as described above and FIG. 9 is a spectrum of the reflectance of the second dielectric film. The transmittance and the reflectance were measured in the same manner as for the first dielectric film. In FIGS. 8 and 9, IR(38 L)-0 deg is the transmittance or the reflectance at an incident angle of 0°, IR(38 L)-30 deg is the transmittance or the reflectance at an incident angle of 30°, and IR(38 L)-40 deg is the transmittance or the reflectance at an incident angle of 40°.

The transmittance and the reflectance characteristics of FIGS. 8 and 9 are summarized in Table 5 below. In Table 5, $T_{MAX}$ is the maximum transmittance or the maximum reflectance within the corresponding wavelength region and the unit is %. $T_{AVG}$ is the average transmittance or the average reflectance within the corresponding wavelength region and the unit is %.

In Table 5, T50% cut-on is the shortest wavelength (unit: nm) showing 50% transmittance or reflectance within the wavelength range of 350 nm to 425 nm. T50% cut-off is the shortest wavelength (unit: nm) showing 50% transmittance or reflectance within the wavelength range of 600 nm to 900 nm.

TABLE 5

| | | Transmittance (Incident Angle 0°) | Reflectance (Incidence angle 0°) |
|---|---|---|---|
| 350 nm to 390 nm | $T_{MAX}$ | 52.2 | 100 |
| | $T_{AVG}$ | 5.6 | 94.1 |
| T50% cut-on | Wavelength (nm) | 417 | 417 |
| 425 nm to 560 nm | $T_{MAX}$ | 95 | 1.4 |
| | $T_{AVG}$ | 94.8 | 0.4 |
| T50% cut-off | Wavelength (nm) | 711 | 712 |

TABLE 5-continued

|  | | Transmittance (Incident Angle 0°) | Reflectance (Incidence angle 0°) |
|---|---|---|---|
| 700 nm | Transmittance (%) | 94.3 | 0.7 |
| 600 nm to 900 nm | $T_{MAX}$ | 95 | 100 |
|  | $T_{AVG}$ | 35.8 | 62.3 |
| 700 nm to 800 nm | $T_{MAX}$ | 94.3 | 99.9 |
|  | $T_{AVG}$ | 13 | 86.3 |
| 800 nm to 1,000 nm | $T_{MAX}$ | 0.1 | 100 |
|  | $T_{AVG}$ | 0 | 100 |
| 1,000 nm to | $T_{MAX}$ | 0.9 | 100 |
| 1,200 nm | $T_{AVG}$ | 0.2 | 99.8 |

The average reflectance in the wavelength range of 600 nm to 900 nm measured on the surface of the second dielectric film layer of the optical filter was about 62.3%. The shortest wavelength showing 50% reflectance within the wavelength range of 600 nm to 900 nm measured on the surface of the second dielectric film of the optical filter was about 712 nm.

Comparative Example 1

Figure 10:
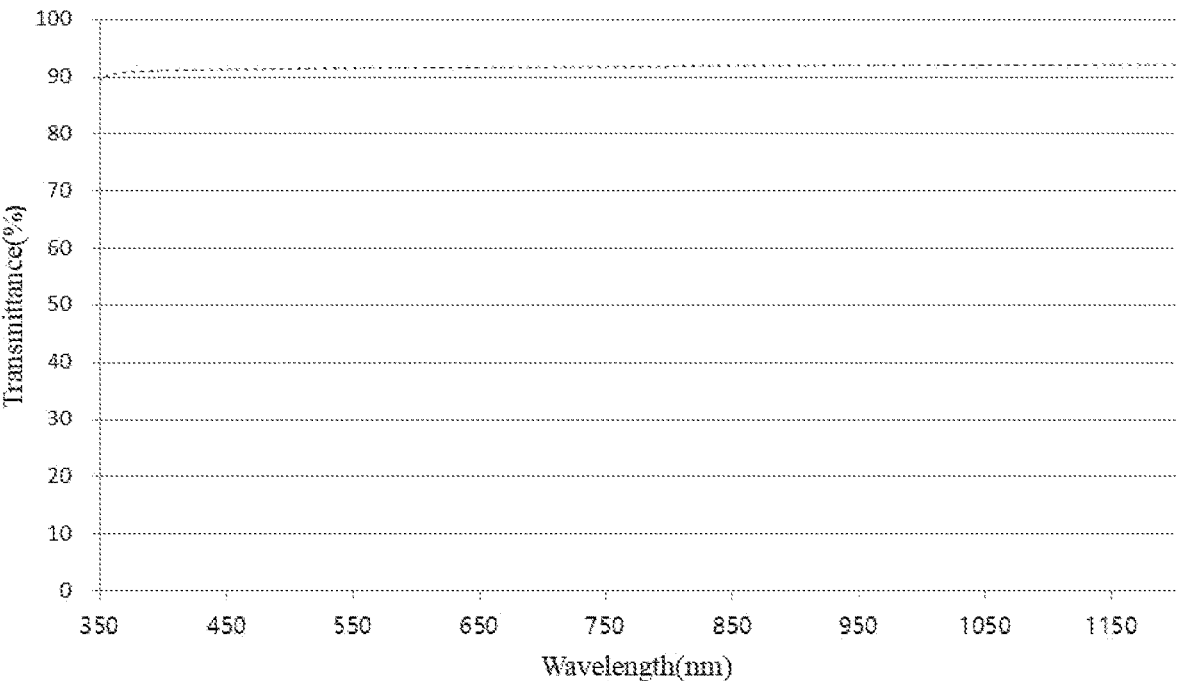
FIGS. 10 and 11 are transmittance spectra of the transparent substrate applied in Comparative Example.

An optical filter was prepared in the same manner as in Embodiment 1 except that a general transparent glass substrate having no absorption characteristics was used as the glass substrate. FIG. 10 is a transmittance spectrum of the transparent glass substrate used for the Comparative Example 1 and it can be seen from the figure that the substrate has no absorption characteristics at all. For these glass substrates, Cu of Equation 1 is 0 weight %.

The average reflectance in the wavelength range of 600 nm to 900 nm measured on the surface of the second dielectric film layer of the optical filter was about 62.3%. The shortest wavelength showing 50% reflectance within the wavelength range of 600 nm to 900 nm measured on the surface of the second dielectric film of the optical filter was about 712 nm.

Comparative Example 2

An optical filter was manufactured in the same manner as in Comparative Example 1 except that the absorption layer material (B) of Preparation Example 2 was used when the absorption layer was formed. The average reflectance in the wavelength range of 600 nm to 900 nm measured on the surface of the second dielectric film layer of the optical filter was about 62.3%. The shortest wavelength showing 50% reflectance within the wavelength range of 600 nm to 900 nm measured on the surface of the second dielectric film of the optical filter was about 712 nm.

Comparative Example 3

Figure 11:
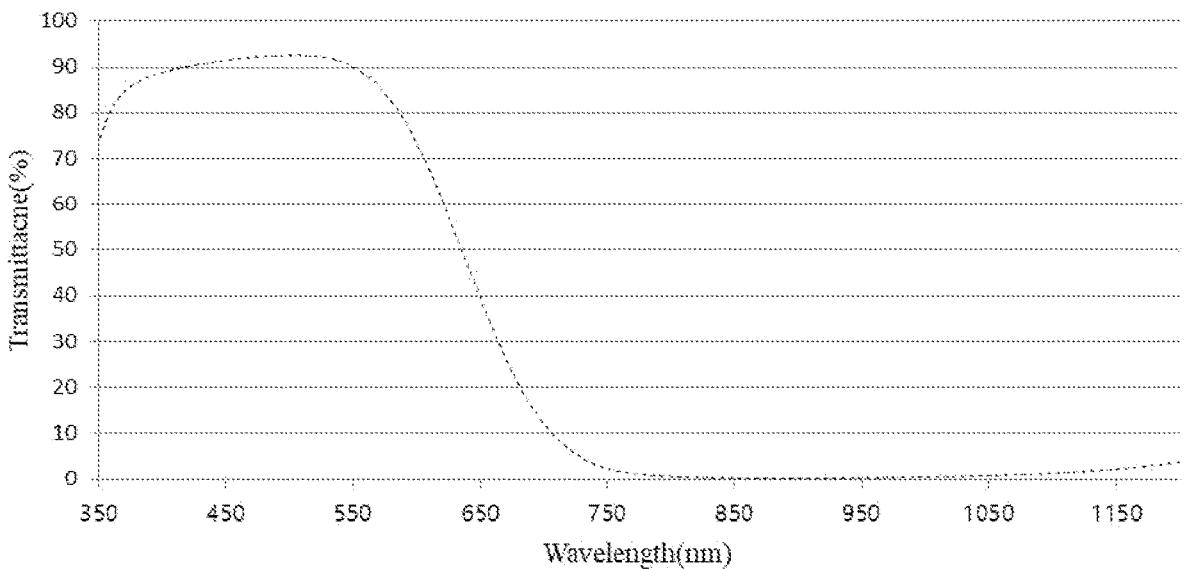

For the infrared absorbing glass substrate, a phosphate-based infrared absorbing glass substrate (manufactured by HOYA) (thickness: about 0.21 mm) showing a transmittance spectrum in FIG. 11 was used. The copper amount measured for the infrared absorbing glass substrate was about 12.08 weight %. Spectral characteristics of the infrared absorbing glass substrate are summarized in Table 6 below. In Table 6, $T_{MAX}$ is the maximum transmittance within a corresponding wavelength range and the unit is %. $T_{AVG}$ is the average transmittance within the corresponding wavelength range and the unit is %. In Table 6, T50% cut-on is the shortest wavelength (unit: nm) showing 50% transmittance within the wavelength range of 350 nm to 425 nm and T50% cut-off is the longest wavelength (unit: nm) showing 50% transmittance within the wavelength range of 560 nm to 700 nm.

TABLE 6

|  | | Infrared Absorbing Glass Substrate (Comparative Example 3) |
|---|---|---|
| 350 nm to 390 nm | $T_{MAX}$ | 87.93 |
|  | $T_{AVG}$ | 83.33 |
| T50% cut-on | Wavelength (nm) | — |
| 425 nm to 560 nm | $T_{MAX}$ | 92.54 |
|  | $T_{AVG}$ | 90.92 |
| T50% cut-off | Wavelength (nm) | 635 |
| 700 nm | Transmittance (%) | 12.01 |
| 700 nm to 800 nm | $T_{MAX}$ | 12.01 |
|  | $T_{AVG}$ | 3.70 |
| 800 nm to 1,000 nm | $T_{MAX}$ | 0.58 |
|  | $T_{AVG}$ | 0.30 |
| 1,000 nm to | $T_{MAX}$ | 3.79 |
| 1,200 nm | $T_{AVG}$ | 1.61 |

In the case of the infrared absorbing glass substrate, since Cu in the Equation 1 is about 12.08 weight %, the V value of the Equation 1 is about 6.51 for the first dielectric film applied to the infrared absorbing glass substrate and the V value of the Equation 1 is about 49.21 for the second dielectric film applied to the infrared absorbing glass substrate. The average reflectance in the wavelength range of 600 nm to 900 nm measured on the surface of the second dielectric film layer of the optical filter was about 62.3%. The shortest wavelength showing 50% reflectance within the wavelength range of 600 nm to 900 nm measured on the surface of the second dielectric film of the optical filter was about 712 nm.

Comparative Example 4

For the infrared absorbing substrate, the same glass substrate was used as Embodiment 1. The absorption layer material (A) of Preparation Example 1 was applied to one surface of the infrared absorption glass substrate and heat treatment was performed at 135° C. for 2 hours to form an absorption layer. The absorber layer had a thickness of about 3 μm. A first dielectric film was formed on the surface where the absorption layer was formed. The first dielectric film was formed by depositing a sub-layer using an ion-beam assisted deposition method. The vacuum level and temperature conditions during deposition were 5.0E-5 Torr and 120° C., respectively, and IBS (Ion Beam Sputtering) source voltage was set to 350 V and current 850 mA. The first dielectric film was formed by alternately forming a TiO₂ layer as a high refractive layer (refractive index of about 2.61) and a SiO₂ layer as a low refractive index layer (refractive index of about 1.46) in the above manner. The sub-layers, the high refractive layer and the low refractive layer, were formed in a total of 21 layers. The thickness of each layer was adjusted as shown in Table 7 below. In Table 7, No. 1 is a layer formed first on the infrared absorbing glass and No. 21 is a layer formed last.

TABLE 7

| Layer Number | Material | Thickness (nm) |
|---|---|---|
| 1 | SiO₂ | 82.75 |
| 2 | TiO₂ | 104.21 |
| 3 | SiO₂ | 180.14 |

TABLE 7-continued

| Layer Number | Material | Thickness (nm) |
|---|---|---|
| 4 | TiO$_2$ | 108.78 |
| 5 | SiO$_2$ | 184.81 |
| 6 | TiO$_2$ | 110.90 |
| 7 | SiO$_2$ | 186.07 |
| 8 | TiO$_2$ | 111.23 |
| 9 | SiO$_2$ | 187.41 |
| 10 | TiO$_2$ | 111.44 |
| 11 | SiO$_2$ | 186.51 |
| 12 | TiO$_2$ | 111.42 |
| 13 | SiO$_2$ | 186.30 |
| 14 | TiO$_2$ | 111.45 |
| 15 | SiO$_2$ | 186.11 |
| 16 | TiO$_2$ | 109.28 |
| 17 | SiO$_2$ | 181.08 |
| 18 | TiO$_2$ | 111.64 |
| 19 | SiO$_2$ | 44.86 |
| 20 | TiO$_2$ | 8.2 |
| 21 | SiO$_2$ | 57.3 |

In such a first dielectric film, it is a dielectric film where R ($n_1/n_2$, where $n_1$ is the refractive index of TiO$_2$ (about 2.61) and $n_2$ is the refractive index of SiO$_2$ (about 1.46)) for the following Equation 1 is about 1.79, $n_2$ is about 1.46 (the refractive index of the SiO$_2$ layer), K is 21, and 2p is 20. Since Cu in the following Equation 1, the copper amount of the infrared absorbing glass substrate, is about 2.89 weight %, the V value of the following Equation 1 is about 14.1 when the first dielectric film is applied to the infrared absorbing glass substrate.

$$V = \log\left[\left\{\left(\frac{(R \times Cu)^{2p}}{n_2} + K\right)^2\right\} + \left\{\frac{(R \times Cu)^{2p}}{n_2} - K\right\}\right]. \quad \text{[Equation 1]}$$

Figure 12:
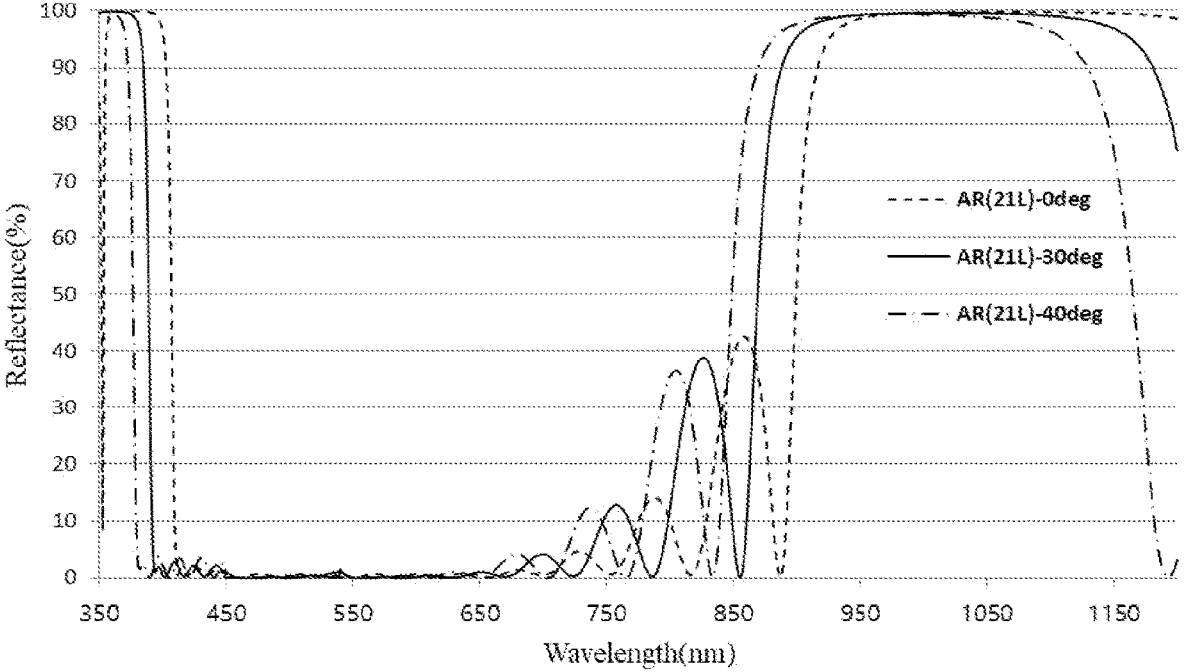

FIG. 12 is a spectrum showing the reflectance of the first dielectric film. The reflectance of the first dielectric film was measured in the same manner as in Embodiment 1. In FIG. 12, AR(21 L)-0 deg is the reflectance at an incident angle of 00, AR(21 L)-30 deg is the reflectance at an incident angle of 300, and AR(21 L)-40 deg is the reflectance at an incident angle of 400.

The reflectance characteristics of FIG. 12 is summarized in Table 8 below. In Table 8, T$_{MAX}$ is the maximum reflectance within the corresponding wavelength range and the unit is % and T$_{AVG}$ is the average reflectance within the corresponding wavelength range and the unit is %.

In Table 8, T50% cut-on is the shortest wavelength (unit: nm) showing 50% transmittance or reflectance within the wavelength range of 350 nm to 425 nm. T50% cut-off is the shortest wavelength (unit: nm) showing 50% transmittance or reflectance within the wavelength range of 600 nm to 900 nm.

TABLE 8

| | | Reflectance (Incidence angle 0°) |
|---|---|---|
| 350 nm to 390 nm | T$_{MAX}$ | 99.9 |
| | T$_{AVG}$ | 94.2 |
| T50% cut-on | Wavelength (nm) | — |
| 425 nm to 560 nm | T$_{MAX}$ | 1.9 |
| | T$_{AVG}$ | 0.5 |
| T50% cut-off | Wavelength (nm) | 900 |
| 700 nm | Transmittance (%) | 0.4 |

TABLE 8-continued

| | | Reflectance (Incidence angle 0°) |
|---|---|---|
| 600 nm to 900 nm | T$_{MAX}$ | 53.5 |
| | T$_{AVG}$ | 8.9 |
| 700 nm to 800 nm | T$_{MAX}$ | 14.1 |
| | T$_{AVG}$ | 5.4 |
| 800 nm to 1,000 nm | T$_{MAX}$ | 99.7 |
| | T$_{AVG}$ | 57.6 |
| 1,000 nm to 1,200 nm | T$_{MAX}$ | 99.8 |
| | T$_{AVG}$ | 99.6 |

The optical filter was prepared by forming the second dielectric film on the surface of the infrared absorbing glass substrate opposite to the surface where the first dielectric film was formed. However, the second dielectric film was formed to have a total of 19 layers by alternately forming a high refractive index TiO$_2$ layer (refractive index of about 2.61) and a low refractive index SiO$_2$ layer (refractive index of about 1.46) and the thickness of each layer was adjusted as shown in Table 9 below. In Table 9, No. 1 is a layer formed first on the infrared absorbing glass and No. 19 is a layer formed last.

TABLE 9

| Layer Number | Material | Thickness (nm) |
|---|---|---|
| 1 | SiO$_2$ | 55.69 |
| 2 | TiO$_2$ | 9.42 |
| 3 | SiO$_2$ | 40.69 |
| 4 | TiO$_2$ | 103.25 |
| 5 | SiO$_2$ | 175.99 |
| 6 | TiO$_2$ | 101.07 |
| 7 | SiO$_2$ | 180.88 |
| 8 | TiO$_2$ | 103.08 |
| 9 | SiO$_2$ | 181.06 |
| 10 | TiO$_2$ | 103.07 |
| 11 | SiO$_2$ | 182.14 |
| 12 | TiO$_2$ | 102.87 |
| 13 | SiO$_2$ | 180.84 |
| 14 | TiO$_2$ | 102.57 |
| 15 | SiO$_2$ | 179.61 |
| 16 | TiO$_2$ | 100.61 |
| 17 | SiO$_2$ | 175.08 |
| 18 | TiO$_2$ | 96.39 |
| 19 | SiO$_2$ | 80.42 |

In the second dielectric film, it is a dielectric film where R ($n_1/n_2$, where $n_1$ is the refractive index of TiO$_2$ (about 2.61) and $n_2$ is the refractive index of SiO$_2$ (about 1.46)) for the Equation 1 is about 1.79, $n_2$ is about 1.46 (the refractive index of the SiO$_2$ layer), K is 19 and 2p is 18. Since Cu of Equation 1, the copper amount of the infrared absorbing glass substrate, is about 2.89 weight %, the V value of the Equation 1 when the second dielectric film is applied to the infrared absorbing glass substrate is about 12.67.

Figure 13:
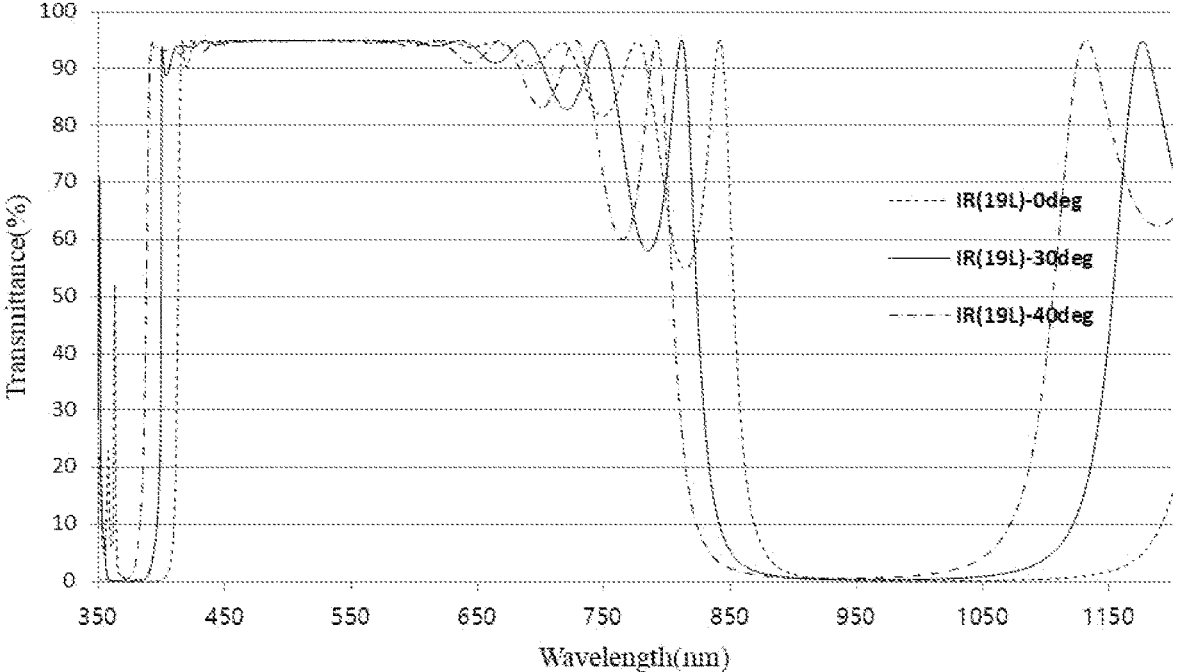
Figure 14:
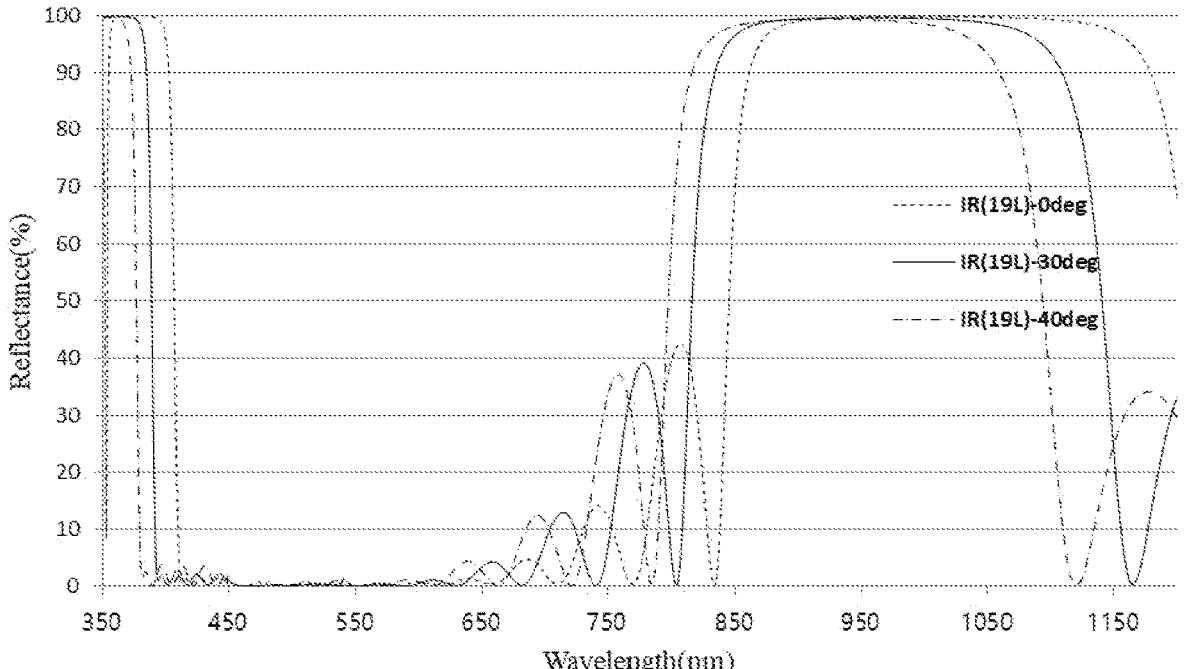
Figure 15:
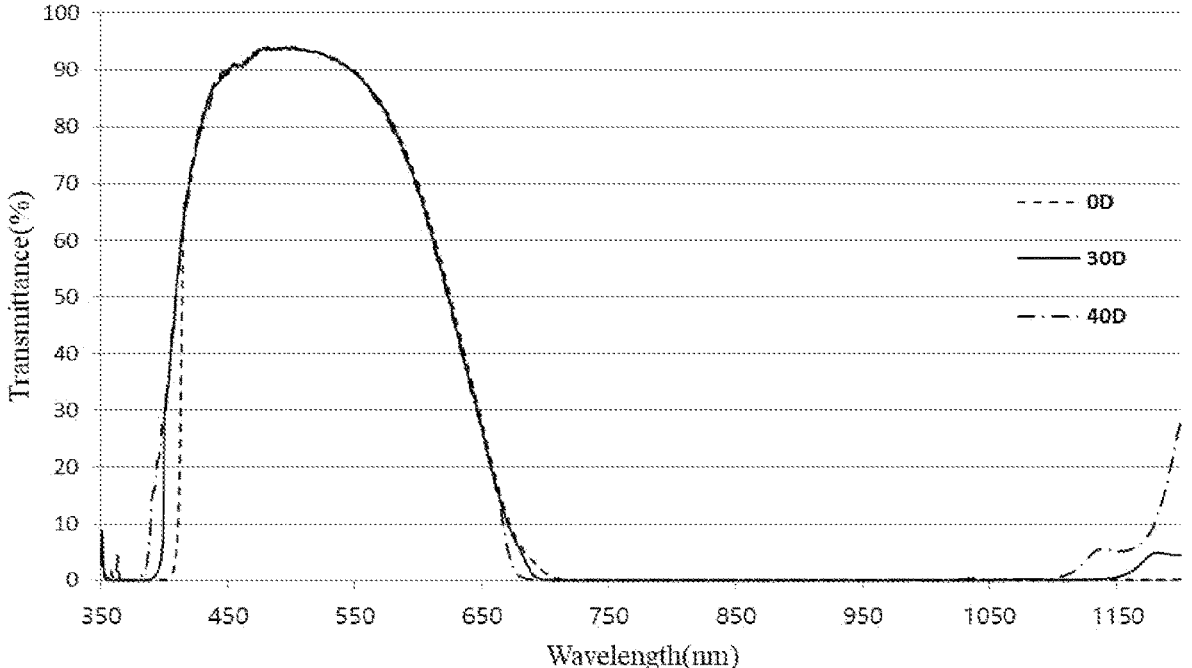
FIG. 15 is a transmittance spectrum of an optical filter of Embodiment.
Figure 16:
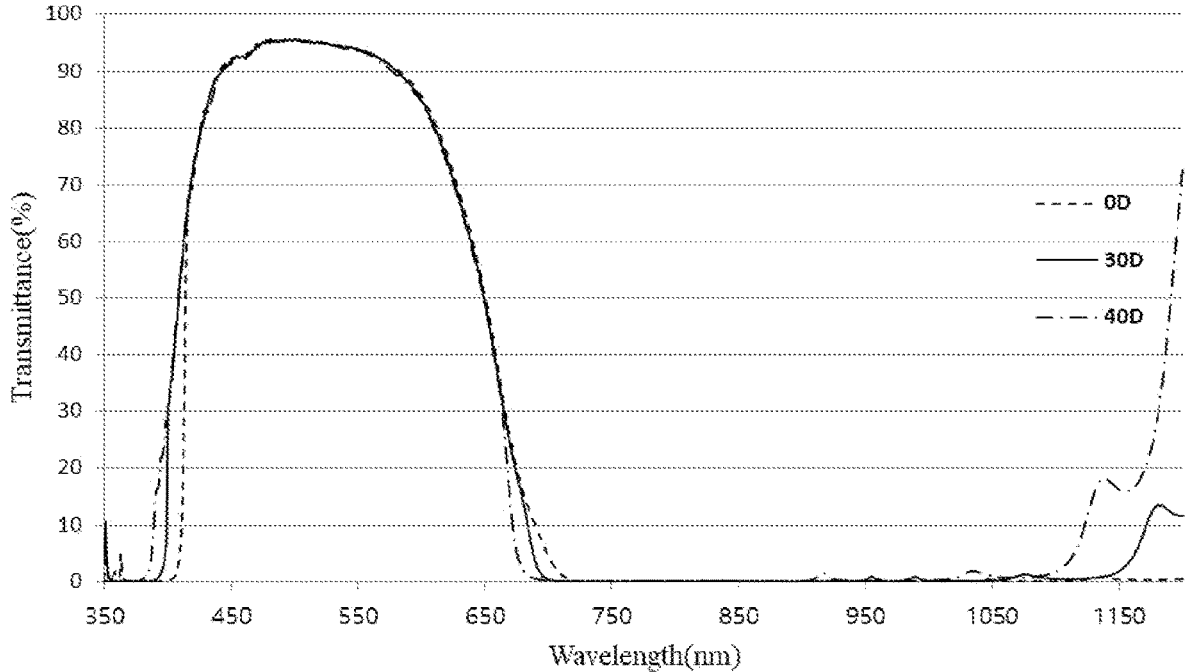
FIGS. 16 to 20 are transmittance spectra of optical filters of Comparative Examples.
Figure 17:
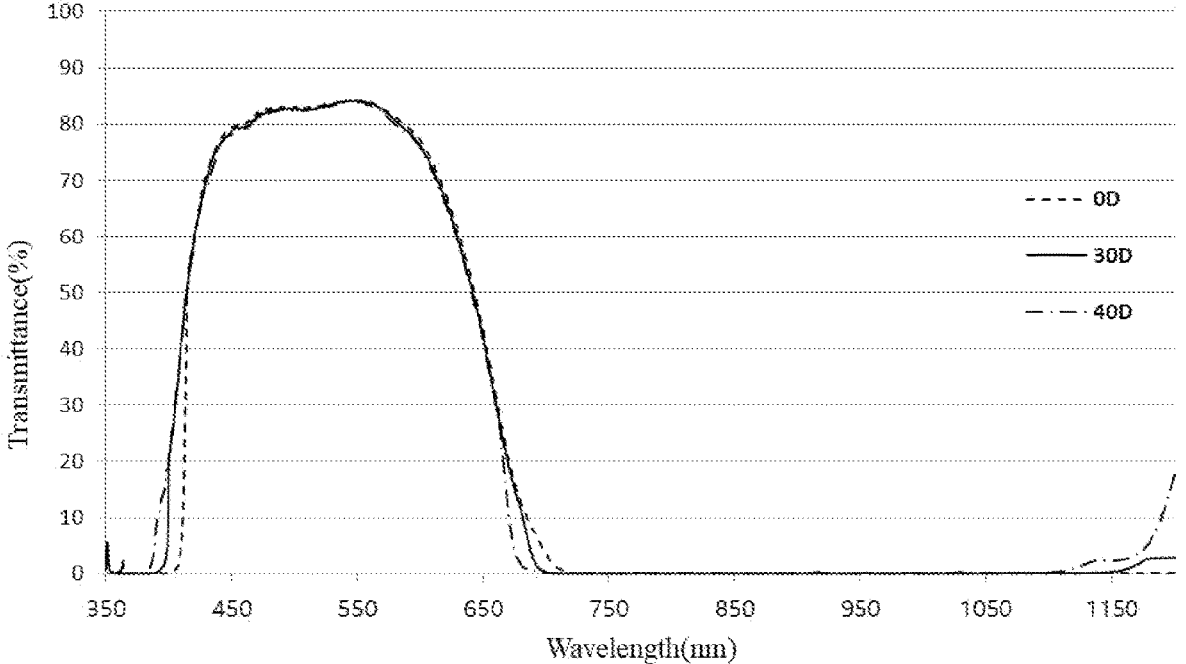
Figure 18:
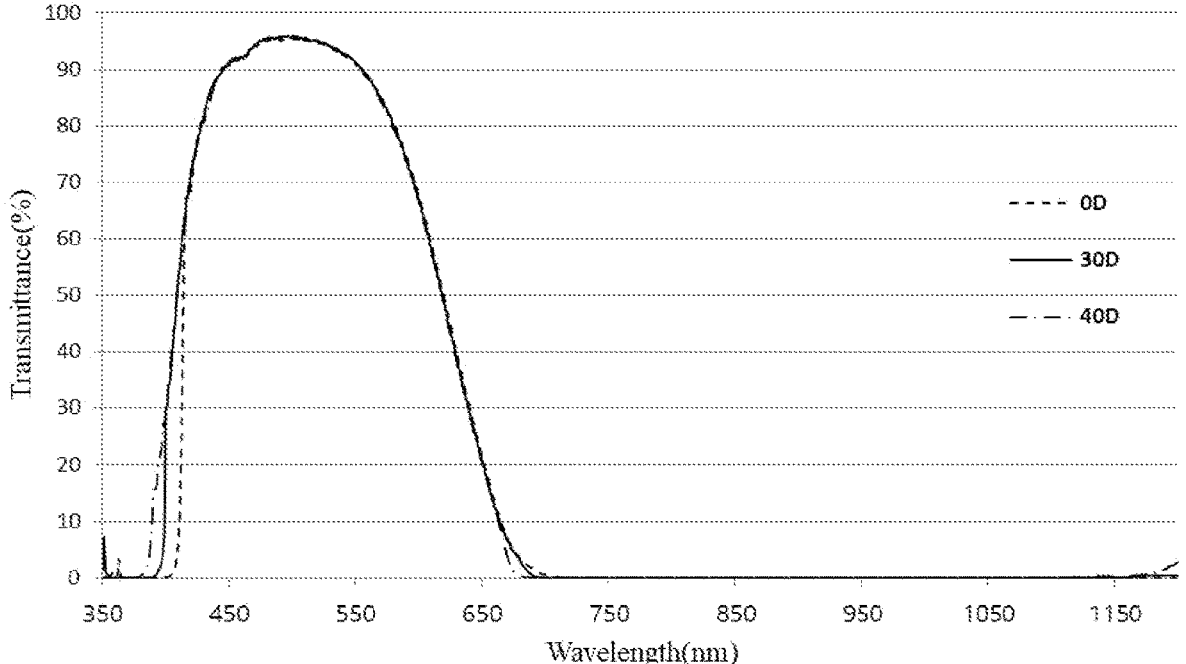
Figure 19:
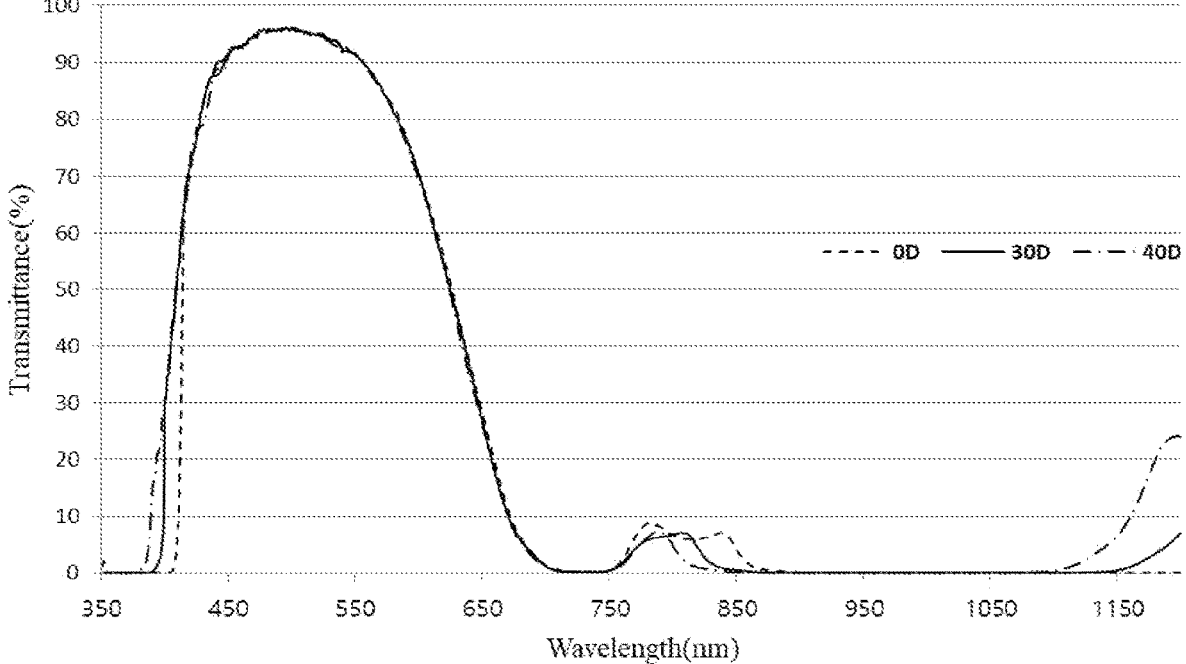
Figure 20:
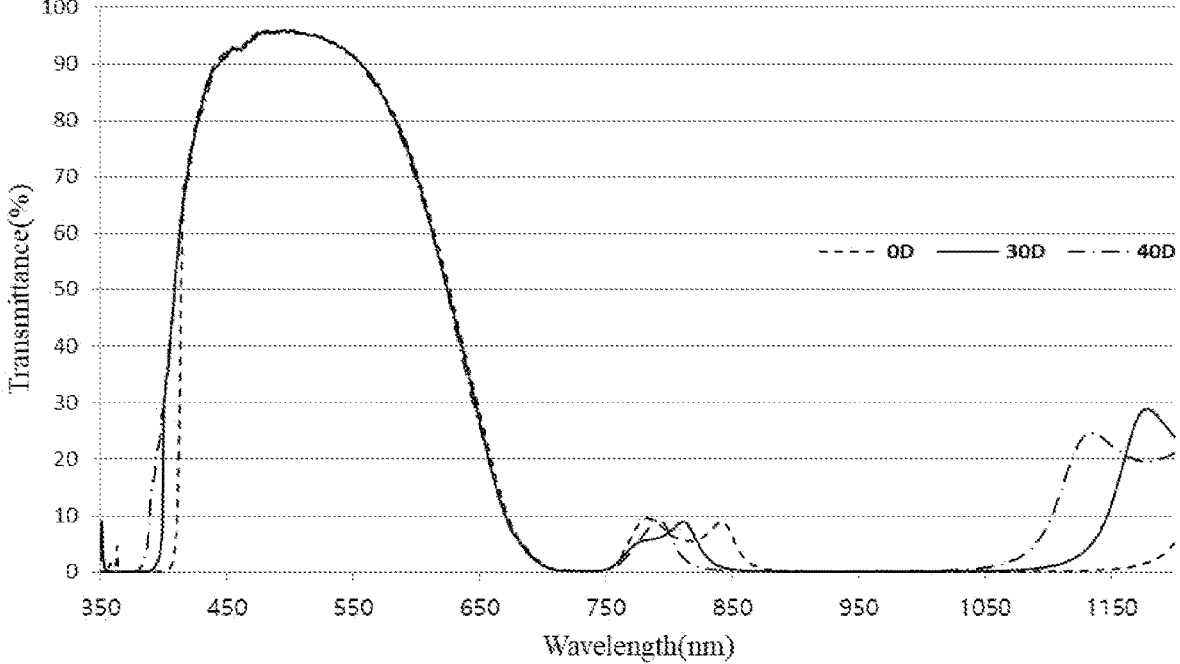

FIG. 13 is a spectrum of the transmittance of the second dielectric film formed in the same manner as described above and FIG. 14 is a spectrum of the reflectance of the second dielectric film. The transmittance and the reflectance of the second dielectric film was measured in the same manner as in Embodiment 1. In FIGS. 13 and 14, IR(19 L)-0 deg is the transmittance or the reflectance at an incident angle of 0°, IR(19 L)-30 deg is the transmittance or the reflectance at an incident angle of 30°, and IR(19 L)-40 deg is the transmittance or the reflectance at an incident angle of 40°.

The transmittance and the reflectance characteristics of FIGS. 13 and 14 are summarized in Table 10 below. In Table 10, $T_{MAX}$ is the maximum transmittance or the maximum reflectance within the corresponding wavelength range and the unit is %. $T_{AVG}$ is the average transmittance or the average reflectance within the corresponding wavelength range and the unit is %.

In Table 10, T50% cut-on is the shortest wavelength (unit: nm) showing 50% transmittance or reflectance within the wavelength range of 350 nm to 425 nm. T50% cut-off is the shortest wavelength (unit: nm) showing 50% transmittance or reflectance within the wavelength range of 600 nm to 900 nm.

TABLE 10

| | | Transmittance (Incident Angle 0°) | Reflectance (Incidence angle 0°) |
|---|---|---|---|
| 350 nm to 390 nm | $T_{MAX}$ | 52.2 | 99.9 |
| | $T_{AVG}$ | 5.6 | 94.2 |
| T50% cut-on | Wavelength (nm) | 363 | — |
| 425 nm to 560 nm | $T_{MAX}$ | 95 | 1.9 |
| | $T_{AVG}$ | 95 | 0.5 |
| T50% cut-off | Wavelength (nm) | 863 | 846 |
| 700 nm | Transmittance (%) | 91.4 | 2.2 |
| 600 nm to 900 nm | $T_{MAX}$ | 95 | 99 |
| | $T_{AVG}$ | 74.2 | 24.5 |
| 700 nm to 800 nm | $T_{MAX}$ | 94.7 | 39.5 |
| | $T_{AVG}$ | 87.6 | 10.2 |
| 800 nm to 1,000 nm | $T_{MAX}$ | 95 | 99.8 |
| | $T_{AVG}$ | 21.1 | 80.5 |
| 1,000 nm to 1,200 nm | $T_{MAX}$ | 15.7 | 99.8 |
| | $T_{AVG}$ | 1.9 | 96.6 |

The average reflectance in the 600 nm to 900 nm region measured on the surface of the second dielectric film layer of the optical filter was about 99%, and the shortest wavelength showing the 50% reflectance in the 600 nm to 900 nm region was about 846 nm.

Comparative Example 5

A filter was prepared in the same manner as in Embodiment 1, except that the filter was prepared by forming the second dielectric film for Comparative Example 5 as the second dielectric film prepared in the same manner as in Comparative Example 4.

Test Example 1: Evaluation of Transmittance Spectrum

FIGS. 15 to 20 are transmittance spectra (based on an incident angle of 0°) of the optical filter of Embodiment 1 (FIG. 15) and Comparative Examples 1 to 5 (FIGS. 16 to 20), respectively. In each spectrum, 0D means for a case where an incident angle is 0°, 30D means for a case where an incident angle is 30°, and 40 D means for a case where an incident angle is 40°. The spectral characteristics of the optical filter are summarized in Table 11 below. In Table 11, $T_{MAX}$ is the maximum transmittance or the maximum reflectance within the corresponding wavelength region and the unit is %. $T_{AVG}$ is the average transmittance or the average reflectance within the corresponding wavelength region and the unit is %. In Table 11, T50% cut-on is the shortest wavelength (unit: nm) showing 50% transmittance or reflectance within the wavelength range of 350 nm to 425 nm. T50% cut-off is the shortest wavelength (unit: nm) showing 50% transmittance or reflectance within the wavelength range of 560 nm to 700 nm.

TABLE 11

| | | Embod. 1 | Comp. Example 1 | Comp. Example 2 | Comp. Example 3 | Comp. Example 4 | Comp. Example 5 |
|---|---|---|---|---|---|---|---|
| 350 nm to 390 nm | $T_{MAX}$ | 4.4 | 4.8 | 2.4 | 3.4 | 2.1 | 4.5 |
| | $T_{AVG}$ | 0.5 | 0.6 | 0.3 | 0.4 | 0 | 0.5 |
| T50% cut-on | Wavelength (nm) | 414 | 412 | 415 | 414 | 414 | 414 |
| 425 nm to 560 nm | $T_{MAX}$ | 94.1 | 95.7 | 84.4 | 95.6 | 96.1 | 96 |
| | $T_{AVG}$ | 91 | 93.2 | 91.3 | 92.2 | 92.5 | 92.8 |
| T50% cut-off | Wavelength (nm) | 624 | 650 | 642 | 619 | 626 | 626 |
| 700 nm (Transmittance (%)) | | 1.3 | 4.4 | 3.4 | 0.6 | 1.3 | 1.3 |
| 700 nm to 800 nm | $T_{MAX}$ | 1.3 | 4.4 | 3.4 | 0.6 | 8.9 | 9.6 |
| | $T_{AVG}$ | 0.1 | 0.4 | 0.3 | 0 | 3.1 | 3.2 |
| 800 nm to 1,000 nm | $T_{MAX}$ | 0 | 0.1 | 0 | 0 | 7.1 | 9.0 |
| | $T_{AVG}$ | 0 | 0 | 0 | 0 | 1.8 | 2.1 |
| 1,000 nm to 1,200 nm | $T_{MAX}$ | 0.2 | 0.8 | 0.1 | 0 | 0.1 | 5.1 |
| | $T_{AVG}$ | 0.1 | 0.2 | 0 | 0 | 0 | 0.6 |

Comparing the transmittance spectra of the optical filters of Embodiment 1 (FIG. 15) and Comparative Example 1 (FIG. 16), for Comparative Example 1, the T50% cut-off wavelength is a longer wavelength compared to Embodiment 1. Therefore, the spectra show that Comparative Example 1 does not properly block for infrared ray, and it also exhibits high transmittance even in a long wavelength band of 700 nm or longer. As a result, Comparative Example 1 may not perform properly as an optical filter. The spectra also show that the transmittance spectrum of the optical filter of Comparative Example 2 (FIG. 17) does not exhibit an appropriate infrared ray blocking effect as for Comparative Example 1, and the transmittance in the visible light region is greatly reduced.

Comparing the transmittance spectra of the optical filters of Embodiment 1 and Comparative Example 3 (FIGS. 15 and 18), for Comparative Example 3, the T50% cut-off wavelength becomes significantly a shorter wavelength compared to the case of Embodiment 1. Therefore, it is anticipated that the utilization efficiency of a long wavelength region with respect to visible light for Comparative Example 3 will be dramatically deteriorated.

In the case of the transmittance spectra of the optical filters of Comparative Examples 4 and 5 (FIGS. 19 and 20), both spectra show that an increase in transmittance in the wavelength range around 750 nm to 850 nm. Therefore, it is indicated that the performance as an optical filter is not appropriately functioning.

Test Example 2: Durability Evaluation

Durability tests were performed on the optical filters of Embodiment 1 and Comparative Example 3. The durability test is a test in which each optical filter is maintained at 85° C. and 85% relative humidity for 120 hours.

Figure 21:
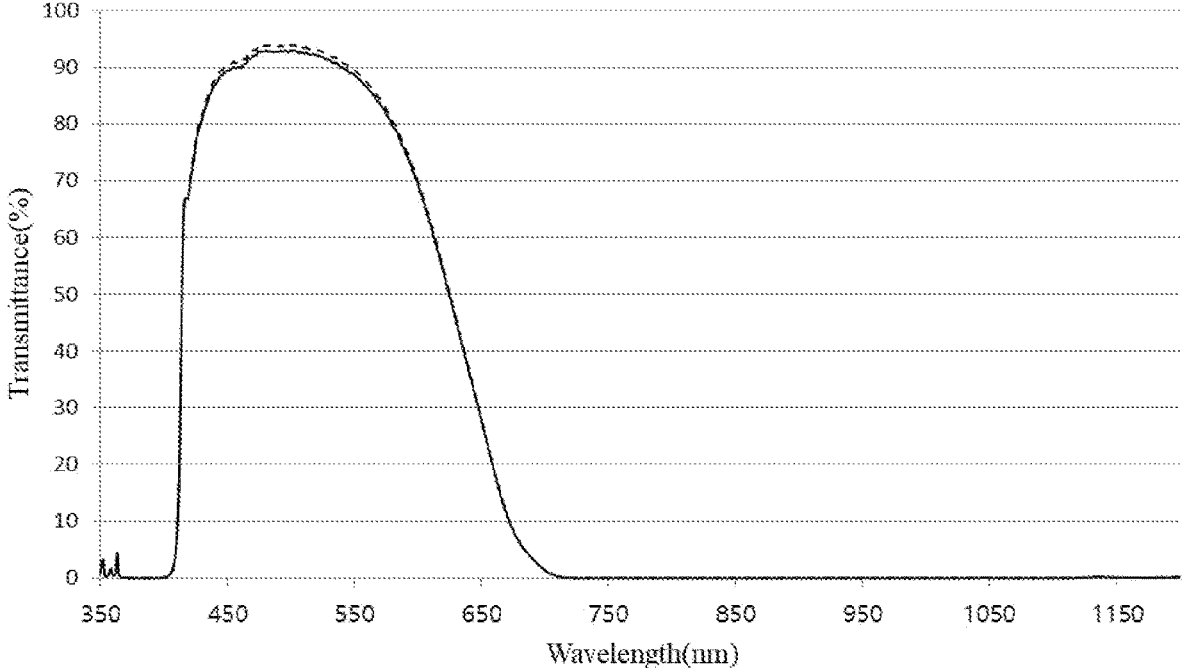
FIG. 21 is a transmittance spectrum of an optical filter of Embodiment before/after performing the durability test.
Figure 22:
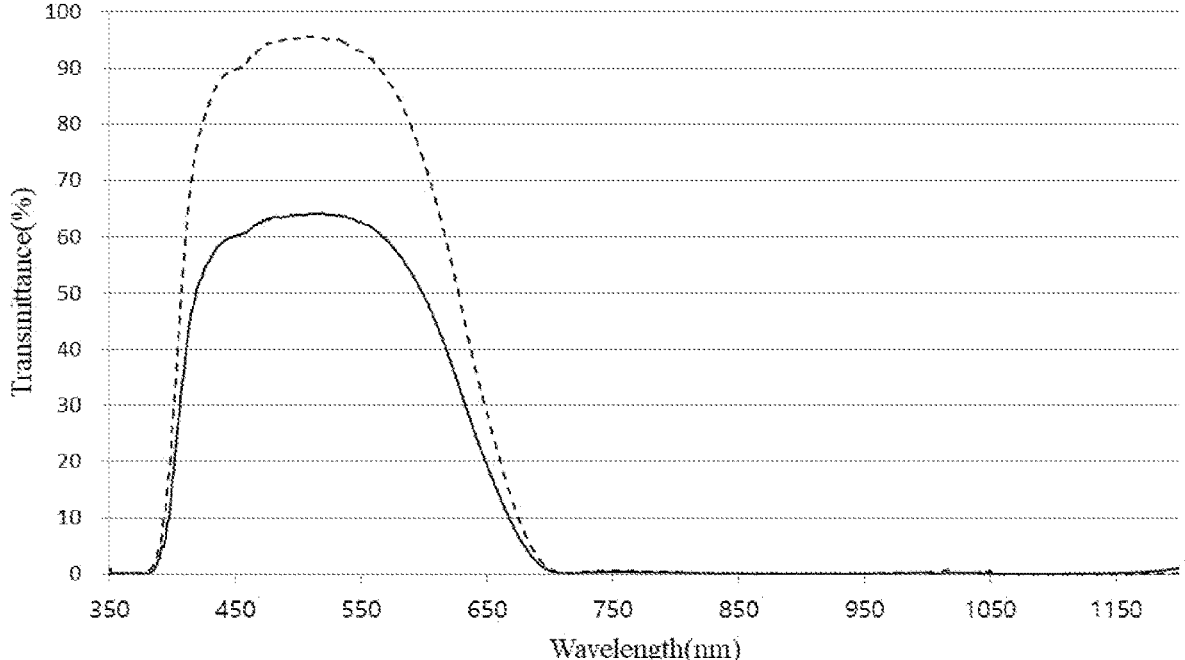
FIG. 22 is a transmittance spectrum of optical filter of Comparative Example before/after performing the durability test.

FIG. 21 is a measurement result of the optical filter of Example 1 and FIG. 22 is a measurement result of the optical filter of Comparative Example 3. The dotted line in FIGS. 21 and 22 is the transmittance characteristic before maintaining for 120 hours at 85° C. and 85% relative humidity condition (before the durability test was performed as in Table 12), and the solid line is transmittance characteristics after maintaining for 120 hours at 85° C. and 85% relative humidity condition (after durability test was performed as in Table 12).

TABLE 12

| | | Example 1 | | Comparative Example 3 | |
|---|---|---|---|---|---|
| | | Before Durability Test | After Durability Test | Before Durability Test | After Durability Test |
| 350 nm to 390 nm | $T_{MAX}$ | 4.4 | 4.3 | 3.4 | 2.7 |
| | $T_{AVG}$ | 0.5 | 0.5 | 0.4 | 0.4 |
| T50% cut-on | Wavelength (nm) | 414 | 414 | 414 | 419 |
| 425 nm to 560 nm | $T_{MAX}$ | 94.1 | 93.1 | 95.6 | 64.2 |
| | $T_{AVG}$ | 91 | 90 | 92.2 | 62.1 |
| T50% cut-off | Wavelength (nm) | 624 | 624 | 619 | 598 |
| 700 nm | Transmittance (%) | 1.3 | 1.3 | 0.6 | 0.6 |
| 700 nm to 800 nm | $T_{MAX}$ | 1.3 | 1.3 | 0.6 | 0.6 |
| | $T_{AVG}$ | 0.1 | 0.1 | 0 | 0.4 |
| 800 nm to 1,000 nm | $T_{MAX}$ | 0 | 0 | 0 | 0.3 |
| | $T_{AVG}$ | 0 | 0 | 0 | 0.1 |

TABLE 12-continued

| | | Example 1 | | Comparative Example 3 | |
|---|---|---|---|---|---|
| | | Before Durability Test | After Durability Test | Before Durability Test | After Durability Test |
| 1,000 nm to 1,200 nm | $T_{MAX}$ | 0.2 | 0.2 | 0 | 1.2 |
| | $T_{AVG}$ | 0.1 | 0.1 | 0 | 0.2 |

Table 12, $T_{MAX}$ is the maximum transmittance within the corresponding wavelength region and the unit is %. $T_{AVG}$ is the average transmittance within the corresponding wavelength region and the unit is %. In Table 12, T50% cut-on is the shortest wavelength (unit: nm) showing a transmittance of 50% within a wavelength region of 350 nm to 425 nm and T50% cut off is the longest wavelength (unit: nm) showing a transmittance of 50% within a wavelength region of 560 nm to 700 nm.

From the results in Table 12, the optical filter of the present invention maintains a constant transmission characteristic almost without change even after the durability test. However, it can be observed in Comparative Example 3 that the transmittance in the visible region is greatly reduced as well as T50% cut-on and T50% cut-off wavelength is also significantly changed.

The present invention also relates to an image capturing device including the optical filter. At this time, a configuration of the image capturing device or an application of the optical filter for the image capturing device is not particularly limited, and thus known configurations and applications may be applied. Moreover, the use of the optical filter of the present invention is not limited to the image capturing device and it can be applied to various other applications requiring near-infrared ray cut (e.g., display devices such as PDPs, etc.).

What is claimed is:

1. An optical filter, comprising:

an infrared-absorbing substrate comprising copper;

a first dielectric film formed on a first surface of the infrared-absorbing substrate and comprising a structure in which a first sub-layer and a second sub-layer, of which refractive indices are different from each other, are repeatedly stacked; and a second dielectric film formed on a second surface of the infrared-absorbing substrate and comprising a structure in which a third sub-layer and a fourth sub-layer, of which refractive indices are different from each other, are repeatedly stacked, wherein a V value for the first dielectric film in Equation 1 is defined as $V_1$ and a V value for the second dielectric film in Equation 1 is defined as $V_2$, Equation 1:

$$V = \log\left[\left\{\left(\frac{R \times Cu)^{2\mu}}{n_2} + K\right)^2\right\} \div \left(\frac{R \times Cu)^{2p}}{n_2} - K\right)\right],$$

wherein R is a ratio $(n_1/n_2)$ of $n_1$ relative to $n_2$; $n_1$ is a refractive index for a sub-layer having a larger refractive index among the first sub-layer and the second sub-layer or among the third sub-layer and the fourth sub-layer; $n_2$ is a refractive index for a sub-layer having a smaller refractive index between the first sub-layer and the second sub-layer or between the third sub-layer and the fourth sub-layer; Cu is an amount of the copper contained in the infrared-absorbing substrate; K is a total number of the first sub-layer and the second sub-layer in the first dielectric film or a total number of the third sub-layer and the fourth sub-layer in the second dielectric film; and 2p is K−1; and wherein a sum of $V_1$ and $V_2$ is in a range of 15 to 50 and a ratio of $V_2$ to $V_1$ ($V_2/V_1$) is in a range of 4 to 12.

2. The optical filter of claim 1, wherein the amount of the copper in the infrared-absorbing substrate is in a range of 1 weight % to 7 weight %.

3. The optical filter of claim 1, wherein the infrared-absorbing substrate has a maximum transmittance within a range of 10% to 45% in a wavelength range of 700 nm to 800 nm and an average transmittance within a range of 5% to 30% in the wavelength range of 700 nm to 800 nm, wherein the infrared-absorbing substrate has a maximum transmittance within a range of 5% to 30% in a wavelength range of 800 nm to 1,000 nm, and an average transmittance within a range of 3% to 20% in the wavelength range of 800 nm to 1,000 nm and wherein the infrared-absorbing substrate has a maximum transmittance within a range of 10% to 70% in a wavelength range of 1,000 nm to 1,200 nm and an average transmittance within a range of 10% to 50% in the wavelength range of 1,000 nm to 1,200 nm.

4. The optical filter of claim 1, wherein the V value for the first dielectric film ($V_1$) according to Equation 1 is in a range of 1 to 10.

5. The optical filter of claim 1, wherein a maximum reflectance for the first dielectric film in a wavelength range of 700 nm to 800 nm is 15% or less and an average reflectance for the first dielectric film in the wavelength range of 700 nm to 800 nm is 10% or less.

6. The optical filter of claim 1, wherein a maximum reflectance for the first dielectric film in a wavelength range of 800 nm to 1,000 nm is 30% or less and an average reflectance for the first dielectric film in the wavelength range of 800 nm to 1,000 nm is 30% or less.

7. The optical filter of claim 1, wherein the V value for the second dielectric film ($V_2$) according to Equation 1 is in a range of 10 to 60.

8. The optical filter of claim 1, wherein the second dielectric film has a maximum reflectance of 50% or more within a wavelength range of 700 nm to 800 nm and an average reflectance of 50% or more within the wavelength range of 700 nm to 800 nm.

9. The optical filter of claim 1, wherein the second dielectric film has a maximum reflectance of 80% or more within a wavelength range of 800 nm to 1,000 nm and an average reflectance of 80% or more within the wavelength range of 800 nm to 1,000 nm.

10. The optical filter of claim 1, wherein the optical filter has an average reflectance of 70% or less in the wavelength range of 600 nm to 900 nm.

11. The optical filter of claim 1, wherein a shortest wavelength exhibiting a reflectance of 50% in a wavelength region of 600 nm to 900 nm is in a range of 690 nm to 750 nm.

12. The optical filter of claim 1 further comprising a light absorbing layer on one or both surfaces of the infrared-absorbing substrate.

13. The optical filter of claim 1, wherein the first dielectric film has a thickness within a range of 100 nm to 500 nm.

14. The optical filter of claim 13, wherein each of the first sub-layer and the second sub-layer has a thickness in a range of 5 nm to 200 nm and an average value of the thicknesses of the first sub-layer and the second sub-layer is in a range of 10 nm to 100 nm.

15. The optical filter of claim 1, wherein the second dielectric film has a thickness within a range of 3,000 nm to 6,000 nm.

16. The optical filter of claim 15, wherein each of the third sub-layer and the fourth sub-layer has a thickness in a range of 1 nm to 300 nm and an average value of the thicknesses of the third sub-layer and the fourth sub-layer is in a range of 80 nm to 200 nm.

17. The optical filter of claim 1, wherein a shortest wavelength exhibiting a transmittance of 50% in a wavelength region of 350 nm to 425 nm is in a range of 400 nm to 425 nm.

18. The optical filter of claim 1, wherein a longest wavelength exhibiting a transmittance of 50% in a wavelength region of 560 nm to 700 nm is in a range of 590 nm to 660 nm.

19. The optical filter of claim 1, wherein an absolute value of $\Delta T_V$ in an Equation 2 is 20% or less:

$$\Delta T_V = 100 \times (T_{Vf} - T_{Vi})/T_{Vi}; \text{ and} \qquad \text{[Equation 2]}$$

wherein for the Equation 2, $T_{Vf}$ is an average transmittance in a wavelength range of 425 nm to 560 nm after maintaining the optical filter at a temperature of 85° C. and a relative humidity of 85% for 120 hours and $T_{Vi}$ is an average transmittance in the wavelength range of 425 nm to 560 nm before maintaining the optical filter at a temperature of 85° C. and a relative humidity of 85% for 120 hours.

20. An image capturing device comprising the optical filter of claim 1.

* * * * *